United States Patent
Lee et al.

(10) Patent No.: US 11,063,292 B2
(45) Date of Patent: Jul. 13, 2021

(54) COMPOSITE ELECTROLYTE STRUCTURE AND LITHIUM METAL BATTERY INCLUDING THE SAME

(71) Applicants: Samsung Electronics Co., Ltd., Suwon-si (KR); Samsung SDI Co., Ltd., Yongin-si (KR)

(72) Inventors: Yonggun Lee, Suwon-si (KR); Saebom Ryu, Suwon-si (KR); Taehwan Yu, Seongnam-si (KR); Wonseok Chang, Seoul (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 297 days.

(21) Appl. No.: 15/840,168

(22) Filed: Dec. 13, 2017

(65) Prior Publication Data

US 2018/0166743 A1 Jun. 14, 2018

(30) Foreign Application Priority Data

Dec. 13, 2016 (KR) .................. 10-2016-0169748

(51) Int. Cl.
*H01M 10/0562* (2010.01)
*H01M 10/052* (2010.01)
(Continued)

(52) U.S. Cl.
CPC ......... *H01M 10/0562* (2013.01); *H01M 4/04* (2013.01); *H01M 4/624* (2013.01);
(Continued)

(58) Field of Classification Search
CPC ........... H01M 10/0562; H01M 10/052; H01M 10/4235; H01M 4/624; H01M 4/04;
(Continued)

(56) References Cited

U.S. PATENT DOCUMENTS 9,029,023 B2  5/2015  Choi
2010/0248026 A1  9/2010  Hinoki et al.
(Continued)

FOREIGN PATENT DOCUMENTS

EP  3024063 A1  5/2016
EP  3240087 A1  11/2017
(Continued)

OTHER PUBLICATIONS

European Search Report for European Patent Application No. 17206775.3 dated Feb. 15, 2018.

*Primary Examiner* — Laura Weiner
(74) *Attorney, Agent, or Firm* — Cantor Colburn LLP

(57) ABSTRACT

A composite electrolyte structure includes: a protective layer having a Young's modulus of about $10^6$ pascals or greater and including a first particle, the first particle including an organic particle, an inorganic particle, an organic-inorganic particle, or a combination thereof, wherein the particle in the protective layer has a particle size of greater than 1 micrometer to about 100 micrometers, and a solid electrolyte layer including a second particle including an organic particle, an inorganic particle, an organic-inorganic particle, or a combination thereof, wherein the second particle has a particle size of greater than 1 micrometer to about 100 micrometers, wherein the first particle and the second particle are the same or different, and wherein the protective layer is on the solid electrolyte layer.

7 Claims, 17 Drawing Sheets

(51) Int. Cl.
*H01M 4/62* (2006.01)
*H01M 4/04* (2006.01)
*H01M 10/42* (2006.01)
*H01M 50/46* (2021.01)
*H01M 50/411* (2021.01)
*H01M 50/431* (2021.01)
*H01M 50/446* (2021.01)
*H01M 50/449* (2021.01)

(52) U.S. Cl.
CPC ..... *H01M 10/052* (2013.01); *H01M 10/4235* (2013.01); *H01M 50/411* (2021.01); *H01M 50/431* (2021.01); *H01M 50/446* (2021.01); *H01M 50/449* (2021.01); *H01M 50/46* (2021.01); *H01M 2300/0065* (2013.01)

(58) Field of Classification Search
CPC .. H01M 2/1673; H01M 2/166; H01M 2/1653; H01M 2/1646; H01M 2/1686; H01M 2300/0065
See application file for complete search history.

(56) References Cited

U.S. PATENT DOCUMENTS

| | | |
|---|---|---|
| 2011/0274983 A1 | 11/2011 | Yontz et al. |
| 2011/0281173 A1 | 11/2011 | Singh et al. |
| 2012/0141881 A1 | 6/2012 | Geier et al. |
| 2013/0224609 A1 | 8/2013 | Lee et al. |
| 2016/0118651 A1 | 4/2016 | Kovalev et al. |
| 2017/0317352 A1 | 11/2017 | Lee et al. |
| 2017/0324097 A1 | 11/2017 | Lee et al. |

FOREIGN PATENT DOCUMENTS

| | | |
|---|---|---|
| JP | 2008288091 A | 11/2008 |
| KR | 1020030007659 A | 1/2003 |
| KR | 1020110124233 A | 11/2011 |
| KR | 1020130099706 A | 9/2013 |
| KR | 1020130111833 A | 10/2013 |
| KR | 101422908 B1 | 7/2014 |
| WO | 2013033126 A1 | 3/2013 |
| WO | 2016028619 A1 | 2/2016 |

NON-POROUS

BIMODAL

POROUS

HOLLOW

COMPOSITE ELECTROLYTE STRUCTURE AND LITHIUM METAL BATTERY INCLUDING THE SAME

CROSS-REFERENCE TO RELATED APPLICATION

This application claims priority to and the benefit of Korean Patent Application No. 10-2016-0169748, filed on Dec. 13, 2016, in the Korean Intellectual Property Office, and all the benefits accruing therefrom under 35 U.S.C. § 119, the content of which in its entirety is incorporated herein by reference.

BACKGROUND

1. Field

The present disclosure relates to a composite electrolyte structure and a lithium metal battery including the same.

2. Description of the Related Art

Lithium secondary batteries are high-performance batteries having the greatest energy density among currently available secondary batteries, and are applicable to various fields such as electric vehicles.

A lithium secondary battery may use a lithium thin film as an anode. When lithium metal is used as the anode, the anode may be highly reactive with a liquid electrolyte during charge or discharge of the battery due to the high reactivity of lithium, or may lead to dendritic growth on the lithium thin film anode. Accordingly, a lithium secondary battery including a lithium metal thin film may have reduced lifetime and stability. Therefore, there is a need for an improved lithium secondary battery component, and a lithium battery including the same.

SUMMARY

Provided is a composite electrolyte structure.

Provided is a lithium metal battery including the composite electrolyte structure, and having improved lithium deposition density, improved energy density, and improved high-rate operation.

According to an aspect of an embodiment, a composite electrolyte structure includes: a protective layer having a Young's modulus of about $10^6$ pascals (Pa) or greater and including a first particle, the first particle including an organic particle, an inorganic particle, an organic-inorganic particle, or a combination thereof, wherein the first particle has a particle size of greater than 1 micrometer (μm) to about 100 μm, and a solid electrolyte layer including a second particle, the second particle including an organic particle, an inorganic particle, an organic-inorganic particle, or a combination thereof, wherein the second particle has an average particle size of greater than 1 μm to about 100 μm, and wherein the first particle and the second particle are the same or different, and wherein the protective layer is on the solid electrolyte layer.

According to an aspect of another embodiment, a composite electrolyte structure includes: a first electrolyte including a first particle including an organic particle, an inorganic particle, an organic-inorganic particle, or a combination thereof, wherein the first particle has a particle size of greater than 1 μm to about 100 μm, a polymer; and a lithium salt; and a second electrolyte including a ceramic conductor on the first electrolyte.

According to an aspect of another embodiment, a lithium metal battery includes: a lithium metal electrode including lithium metal or a lithium metal alloy; the composite electrolyte structure on at least a portion of the lithium metal electrode; and a cathode.

Also disclosed is a method of manufacturing a composite electrolyte structure, the method including: providing a first composition for forming a protective layer, the first composition including a first particle including an organic particle, an inorganic particle, an organic-inorganic particle, or a combination thereof, wherein the first particle has a particle size of greater than 1 micrometer to about 100 micrometers, and a polymerizable compound; disposing the first composition on a substrate and crosslinking and polymerizing the polymerizable compound to form a protective layer; providing a second composition for forming a solid electrolyte, the second composition including a second particle, the second particle including an organic particle, an inorganic particle, an organic-inorganic particle, or a combination thereof, wherein the second particle has an average particle size of greater than 1 micrometer to about 100 micrometers, and a first lithium salt; and disposing the second composition on the protective layer to form the composite electrolyte structure, wherein the first particle and the second particle are the same or different.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
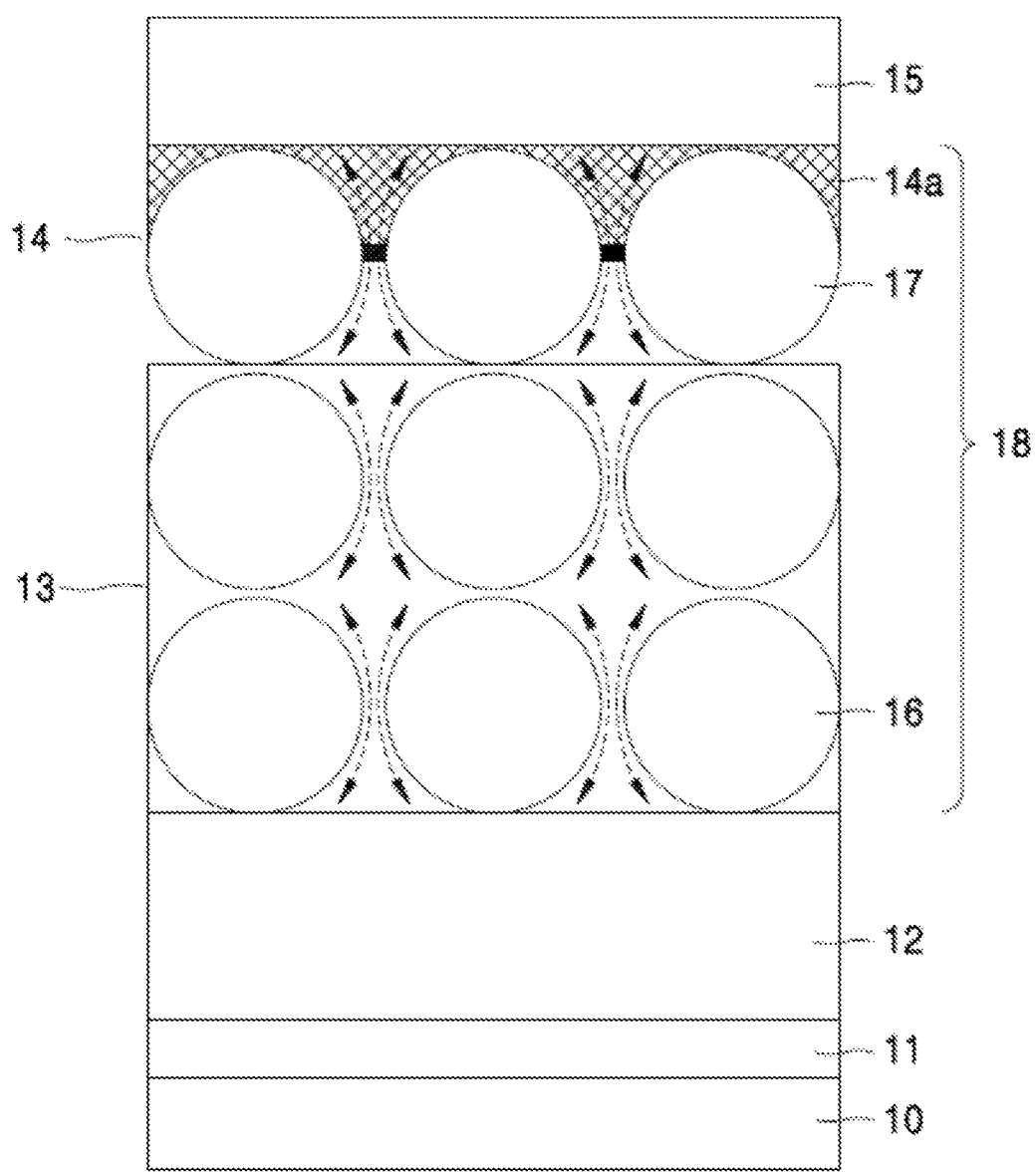
FIGS. 1 and 2 are schematic views illustrating structures of lithium metal batteries according to different embodiments.

Reference will now be made in detail to embodiments of a composite electrolyte structure and a lithium metal battery including the composite electrolyte structure, examples of which are illustrated in the accompanying drawings, wherein like reference numerals refer to like elements throughout. In this regard, the present embodiments may have different forms and should not be construed as being limited to the descriptions set forth herein. Rather, these embodiments are provided so that this disclosure will be thorough and complete, and will fully convey the scope of the invention to those skilled in the art. Accordingly, the embodiments are merely described below, by referring to the figures, to explain aspects.

When an element or layer is referred to as being "on" or "above" another element or layer, it includes the element or layer that is directly or indirectly in contact with the element or layer. Thus it will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. As used herein, the term "and/or" includes any and all combinations of one or more of the associated listed items. "Or" means "and/or." Expressions such as "at least one of," when preceding a list of elements, modify the entire list of elements and do not modify the individual elements of the list. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

As used herein, "average particle size" or "average particle diameter" or "D50 particle size" refers to a particle diameter corresponding to 50% of the particles in a distribution curve in which particles are accumulated in the order of particle diameter from the smallest particle to the largest particle and a total number of accumulated particles is 100%. The average particle size may be measured by methods known to those of skill in the art. For example, the average particle size may be measured with a particle size analyzer, e.g., by dynamic light scattering, or may be measured using a transmission electron microscope (TEM) or a scanning electron microscope (SEM).

As used herein the terms "porous" refers to the presence of voids or pores in a material. The term "porosity" is used to refer to a measure of the empty space (i.e., voids or pores) in the material and is determined as a percentage of the volume of voids in a material based on the total volume of the material.

According to an aspect of the present disclosure, a composite electrolyte structure includes: a protective layer having a Young's modulus of about $10^6$ pascals (Pa) or greater and including a first particle, the first particle comprising an organic particle, an inorganic particle, an organic-inorganic particle, or a combination thereof, where the particle of the protective layer has a particle size of greater than 1 μm to about 100 μm; and a solid electrolyte layer comprising a second particle, the second particle comprising an organic particle, an inorganic particle, an organic-inorganic particle or a combination thereof, where the second particle has a particle size of greater than 1 μm to about 100 μm, and wherein the first particle and the second particle are the same or different, and wherein the protective layer is on the solid electrolyte layer.

In some embodiments, the solid electrolyte may include: i) a first electrolyte including the second particle comprising an organic particle, an inorganic particle, an organic-inorganic particle, or a combination thereof, the second particle having a particle size of greater than 1 μm to about 100 μm or less, a polymer, and a lithium salt; and ii) a second electrolyte comprising a ceramic conductor.

The second electrolyte including a ceramic conductor may have suitable ionic conductivity. The second electrolyte may be a polymer electrolyte that may be stable under high voltage conditions.

According to an aspect of the present disclosure, an anode for a lithium metal battery includes: a lithium metal electrode including lithium metal or a lithium metal alloy; and a protective layer on at least a portion of the lithium metal electrode, wherein the protective layer has a Young's modulus of about $10^6$ Pa or greater and includes a first particle comprising an organic particle, an inorganic particle, an organic-inorganic particle, or a combination thereof, wherein the first particle of the protective layer has a particle size of greater than 1 μm to about 100 μm, and a crosslinked material including a polymerizable compound having a weight average molecular weight of about 5,000 Daltons (Da) or less disposed between adjacent first particles of the protective layer.

A lithium metal or a lithium metal alloy has a relatively high electric capacity per unit weight, and thus may be used to implement a high-capacity battery. However, using such a lithium metal or lithium metal alloy may cause dendritic growth during the deposition/dissolution of lithium ions during charge and discharge of the battery and consequently results in a short circuit between the cathode and the anode. A lithium metal or lithium metal alloy electrode may be highly reactive with an electrolyte and cause a side reaction with the electrolyte and consequently reduce the cycle life of a battery. To address this drawback, a protective layer for protecting the surface of the lithium metal or lithium metal alloy electrode may be used.

To prepare an electrolyte which may operate at a high voltage, an electrolyte including a ceramic conductor may be used. However, since the ceramic conductor is reactive with a lithium metal or lithium metal alloy electrode, a protective layer for the electrolyte including the ceramic conductor is desired.

The electrolyte including a ceramic conductor may separate a catholyte and an anolyte from one another. When an electrolyte including a ceramic conductor (referred to also as a ceramic electrolyte) is used, any suitable material may be used as the catholyte). Rate characteristics of the battery may be improved regardless of the form of the ceramic electrolyte, e.g., whether the ceramic electrolyte is a liquid electrolyte, an ionic liquid electrolyte, or a gel electrolyte.

Since the ceramic electrolyte is reactive with lithium metal, it is beneficial to include a protective layer for the ceramic electrolyte. When the ceramic electrolyte includes a titanium-based ceramic conductor or a sulfur compound, the ceramic electrolyte may be partially reduced by lithium metal. Therefore, a protective layer inhibiting the reaction between the ceramic conductor electrolyte and the lithium metal is desired.

To address this problem, the inventors have advantageously discovered a composite electrolyte structure that may compensate for the problem.

A composite electrolyte structure according to an embodiment may have a structure that includes: a protective layer having a Young's modulus of about $10^6$ Pa or greater and including a first particle comprising an organic particle, an inorganic particle, an organic-inorganic particle, or a combination thereof, where the first particle of the protective layer has a particle size of greater than 1 μm to about 100 μm; and a solid electrolyte layer including a second particle comprising an inorganic particle, an organic-inorganic particle, or a combination thereof, where the second particle of the solid electrolyte layer has a particle size of greater than 1 μm to about 100 μm.

In some embodiments, the composite electrolyte structure may have a structure that includes: a first electrolyte including the second particle including an organic particle, an inorganic particle, an organic-inorganic particle or a combination thereof, where the second particle may be porous or non-porous has a particle size of greater than 1 μm to about 100 μm or less; a polymer; and a lithium salt, and a second electrolyte including a ceramic conductor.

In some embodiments, the solid electrolyte layer comprises a first lithium salt, and the solid electrolyte of the composite electrolyte structure may include a third electrolyte including: a third particle selected from an organic particle, an inorganic particle, an organic-inorganic particle, or a combination thereof, where the third particle has a particle size of greater than 1 μm to about 100 μm; a polymer; and a lithium salt.

The protective layer of the composite electrolyte structure may include a crosslinked polymerizable compound between the first particles. As used herein, the term "polymerizable oligomer" refers to an oligomer which is capable of being polymerized to form a polymer. The first particle of the protective layer and the second particle of the electrolyte layer may each independently be porous or non-porous. The porous particle may be a hollow particle, a mesoporous particle including mesopores, or a nanoporous particle including nanopores.

The first particle of the protective layer, the second particle of the electrolyte layer, or a combination thereof, may be a microsphere having an average particle diameter of about 1.1 µm to about 50 µm. The first particle in the protective layer, the second particle in the electrolyte layer, or a combination thereof, may be a porous particle including pores having an average pore diameter, for example, about 10 nm to about 50 nm. When the particle is a microsphere, minimal aggregation of particles occurs, unlike when the particle is in any other form, for example, when the particle is not a microsphere.

The protective layer may include a liquid electrolyte.

The first particle in the protective layer may include at least one selected from polystyrene, a copolymer including a styrene repeating unit and a styrene repeating unit, a copolymer including a repeating unit having a crosslinkable functional group, and a crosslinked polymer.

An amount of the crosslinked polymerizable compound in the protective layer may be about 10 parts by weight to about 50 parts by weight, based on 100 parts by weight of the first particle in the protective layer.

The inorganic particle and the organic-inorganic particle of the protective layer may include: i) a first particle A comprising a cage-structured silsesquioxane, a metal-organic framework (MOF), $Li_{1+x+y}Al_xTi_{2-x}Si_yP_{3-y}O_{12}$ wherein $0≤x<2$ and $0≤y<3$, $Pb(Zr_{1-x}Ti_x)O_3$ (PZT) wherein $0≤x≤1$, $Pb_{1-x}La_xZr_{1-y}Ti_yO_3$(PLZT) wherein $0≤x<1$ and $0≤y<1$, $Pb(Mg_{1/3}Nb_{2/3})O_3$—$PbTiO_3$ (PMN-PT), $HfO_2$, $SrTiO_3$, $SnO_2$, $CeO_2$, $Na_2O$, $MgO$, $NiO$, $CaO$, $BaO$, $ZnO$, $ZrO_2$, $Y_2O_3$, $Al_2O_3$, $TiO_2$, $SiO_2$, SiC, lithium phosphate (e.g., $Li_3PO_4$), lithium titanium phosphate $(Li_xTi_y(PO_4)_3$ wherein $0<x<2$, and $0<y<3$, lithium aluminum titanium phosphate (e.g., $Li_xAl_yTi_z(PO_4)_3$ wherein $0<x<2$, $0<y<1$, and $0<z<3$, $Li_{1+x+y}(Al_aGa_{1-a})_x(Ti_bGe_{1-b})_{2-x}Si_yP_{3-y}O_{12}$ wherein $0≤x≤1$, $0≤y≤1$, $0≤a≤1$, and $0≤b≤1$), lithium lanthanum titanate (e.g., $Li_xLa_yTiO_3$ wherein $0<x<2$ and $0<y<3$), lithium germanium thiophosphate (e.g., $Li_xGe_yP_zS_w$ wherein $0<x<4$, $0<y<1$, $0<z<1$, and $0<w<5$), lithium nitride (e.g., $Li_xN_y$ wherein $0<x<4$ and $0<y<2$), a $SiS_2$ glass (e.g., $Li_xSi_yS_z$, wherein $0<x<3$, $0<y<2$, and $0<z<4$), a $P_2S_5$ glass (e.g., $Li_xP_yS_z$, wherein $0<x<3$, $0<y<3$, and $0<z<7$), $Li_2O$, LiF, LiOH, $Li_2CO_3$, $LiAlO_2$, a $Li_2O$—$Al_2O_3$—$SiO_2$—$P_2O_5$—$TiO_2$—$GeO_2$ ceramic, and a garnet ceramic (e.g., $Li_{3+x}La_3M_2O_{12}$, wherein $0≤x≤5$ and M=Te, Nb, or Zr); ii) a cross-linked structure of the first particle A having crosslinkable functional groups; or iii) a combination thereof.

In some embodiments of the composite electrolyte structure, the ceramic conductor may comprise $Li_2S$—$P_2S_5$, $Li_2S$—$P_2S_5$—$Li_4SiO_4$, $Li_2S$—$Ga_2S_3$—$GeS_2$, $Li_2S$—$Sb_2S_3$—$GeS_2$, $Li_{3.25}$—$Ge_{0.25}$—$P_{0.75}S_4$, $(La_aLi_{1-a})TiO_3$ wherein $0≤a≤1$ (LLTO), $Li_6La_2CaTa_2O_{12}$, $Li_6La_2ANb_2O_{12}$ (wherein A is Ca or Sr), $Li_2Nd_3TeSbO_{12}$, $Li_3BO_{2.5}N_{0.5}$, $Li_9SiAlO_8$, $Li_{1+x}Al_xGe_{2-x}(PO_4)_3$ (LAGP) (wherein $0.1≤x≤0.7$, for example, $0.1≤x≤0.5$), $Li_{1+x}Al_xTi_{2-x}(PO_4)_3$ (LATP) (wherein $0.1≤x≤0.7$, for example, $0.1≤x≤0.5$), $Li_{1+x}Ti_{2-x}Al_xSi_y(PO_4)_{3-y}$ (wherein $0.1≤x≤0.7$, for example, $0.1≤x≤0.5$, and $0.1≤y<1$, for example, $0.1≤y≤0.8$), $LiAl_xZr_{2-x}(PO_4)_3$ (wherein $0.1≤x≤0.7$, for example, $0.1≤x≤0.5$), and $LiTi_xZr_{2-x}(PO_4)_3$ (wherein $0.1≤x≤0.7$, for example, $0.1≤x≤0.5$). For example, the $Li_{1+x}Al_xTi_{2-x}(PO_4)_3$ (LATP) may be $Li_{1.4}Ti_{1.6}Al_{0.4}P_3O_{12}$. A combination comprising at least one of the foregoing may also be used.

The second electrolyte may further include a binder. Examples of the binder may include polyvinylidene fluoride, polyvinylidene fluoride-hexafluoropropylene (PVDF-HFP), polyethylene oxide (PEO), a poly(styrene-b-ethyleneoxide) block copolymer (PS-PEO), poly(styrene-butadiene), poly(styrene-isoprene-styrene), or a combination thereof. An amount of the binder may be about 1 part by weight to about 10 parts by weight, for example, about 2 parts by weight to about 10 parts by weight, based on 100 parts by weight of the ceramic conductor. The second electrolyte may have a thickness of, for example, about 100 µm to about 300 µm, for example, about 125 µm to about 275 µm, or for example, about 150 µm to about 250 µm.

FIG. 1 is a schematic view illustrating a structure of a lithium metal battery according to an embodiment.

Referring to FIG. 1, a catholyte 11 may be on a cathode 10. A second solid electrolyte layer 12 including a ceramic conductor may be on the catholyte 11. A protective layer 14 and a first solid electrolyte layer 13 may be on the second solid electrolyte 12. The first solid electrolyte layer 13 and the protective layer 14 may constitute a composite electrolyte structure 18. The composite electrolyte structure 18 may serve as an anolyte.

The protective layer 14 may include a crosslinked material 14a of a polymerizable compound between first particles 17 in the protective layer, as illustrated in FIG. 1. The crosslinked material 14a of the polymerizable compound may fill pores and empty spaces between the first particles 17 in the protective layer. The protective layer 14 may have improved strength due to this integrated structure.

The second solid electrolyte layer 12 including a ceramic conductor may be a non-permeable layer. When such a non-permeable solid electrolyte layer is present, the catholyte and the anolyte may be separated from one another, so that the cathode 10 may have a high density. Accordingly, a lithium metal battery having improved energy density and improved rate characteristics may be manufactured.

The particles 16 in the first solid electrolyte layer 13 may control distribution of charges to be uniform, such that the charges are not concentrated in some regions, as illustrated in FIG. 1. The particles 16 in the first solid electrolyte layer 13 may be non-porous or porous. For example, when the particles 16 have a non-porous structure, the first solid electrolyte layer 13 may have further improved mechanical properties.

The first solid electrolyte layer 13 may include a polymer, the particles 16, and a lithium salt. An amount of the particles 16 in the first solid electrolyte layer 13 may be in a range of about 5 parts by weight to about 20 parts by weight, or about 5 parts by weight to about 15 parts by weight, based on 100 parts by weight of the polymer. An amount of the lithium salt may be in a range of about 5 parts by weight to about 40 parts by weight, or about 10 parts by weight to about 35 parts by weight, or about 12 parts by weight to about 30 parts by weight, based on 100 parts by weight of the polymer.

The polymer in the first solid electrolyte layer 13 is not specifically limited. For example, the polymer may include polyethylene oxide (PEO), polyvinylidene fluoride, polyvinylidene fluoride-hexafluoropropylene (PVDF-HFP), a poly(styrene-b-ethyleneoxide) block copolymer (PS-PEO), a poly(styrene-butadiene), a poly(styrene-isoprene-styrene), a poly(styrene-b-divinylbenzene) block copolymer, a poly(styrene-ethyleneoxide-styrene) block copolymer, or a combination thereof.

The lithium salt may include, for example, LiSCN, LiN(CN)$_2$, LiClO$_4$, LiBF$_4$, LiAsF$_6$, LiPF$_6$, LiCF$_3$SO$_3$, LiC(CF$_3$SO$_2$)$_3$, LiN(SO$_2$C$_2$F$_5$)$_2$, LiN(SO$_2$CF$_3$)$_2$, LiN(SO$_2$F)$_2$, LiSbF$_6$, LiPF$_3$(CF$_2$CF$_3$)$_3$, LiPF$_3$(CF$_3$)$_3$, LiB(C$_2$O$_4$)$_2$, or a combination thereof.

A lithium metal or lithium metal alloy electrode 15 may be disposed on the protective layer 14.

Figure 2:
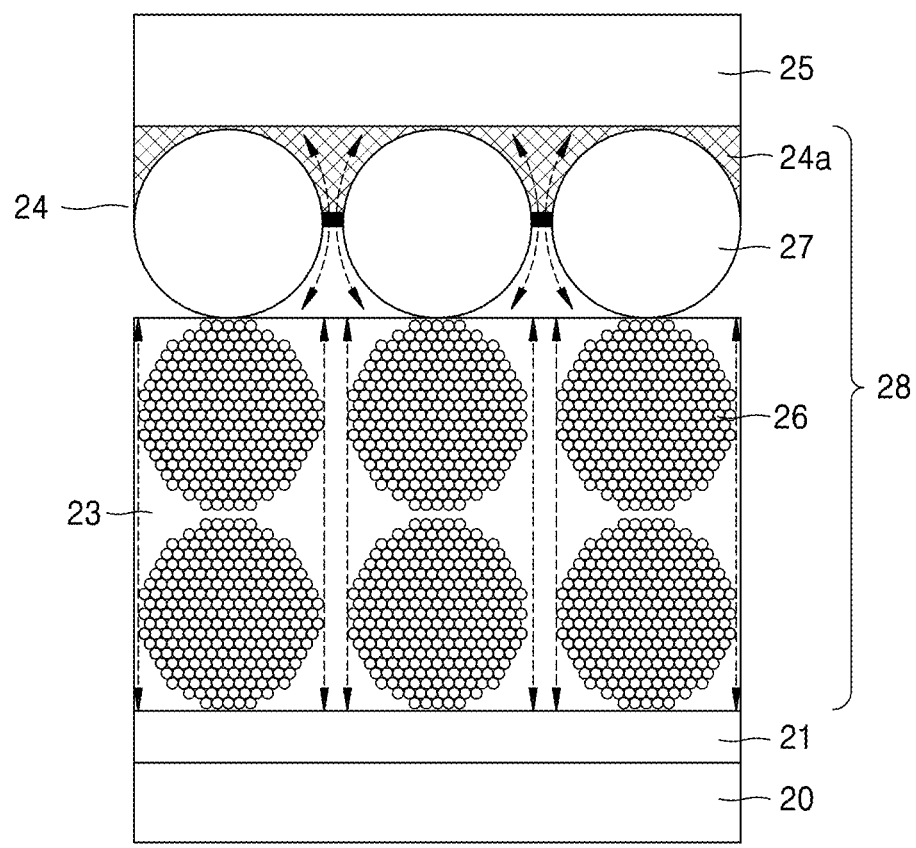

FIG. 2 is a schematic view illustrating a composite electrolyte structure according to another embodiment.

Referring to FIG. 2, a catholyte 21 may be on a cathode 20. A solid electrolyte layer 23 and a protective layer 24 may be on the catholyte 21. The solid electrolyte layer 23 and the protective layer 24 may constitute a composite electrolyte structure 28. The solid electrolyte layer 23 may include second particles 26, a polymer, and a lithium salt. Types of the polymer and the lithium salt of the solid electrolyte layer 23 may be defined the same as those of the solid electrolyte 12 of FIG. 1.

The second particles 26 of the solid electrolyte layer 23 may include, for example, porous particles, which may improve ionic conductivity. A protective layer 24 and a lithium metal or lithium metal alloy electrode 25 may be sequentially stacked on the solid electrolyte layer 23, similar to the embodiment illustrated in FIG. 1. The protective layer 24 may include a crosslinked material 24a of a polymerizable compound between particles 27, similar to the protective layer 14 illustrated in FIG. 1.

The protective layer 14 of FIG. 1 and the protective layer 24 of FIG. 2 each include a crosslinked material 14a and 24a, respectively, of a polymerizable compound between the first particles 17 and 27, respectively, as illustrated in FIGS. 1 and 2. In some other embodiments, a protective layer according to an embodiment may have a structure not including a crosslinked material of a polymerizable compound between the particles therein.

Figure 4A:
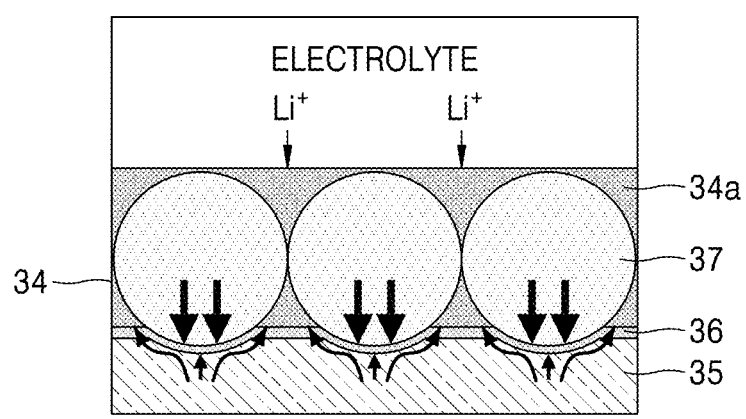
FIGS. 4A and 4B are schematic views of an embodiment of an anode for a lithium metal battery, which illustrate the protective function of a protective layer including the particle, for example, a microsphere particle.
Figure 4B:
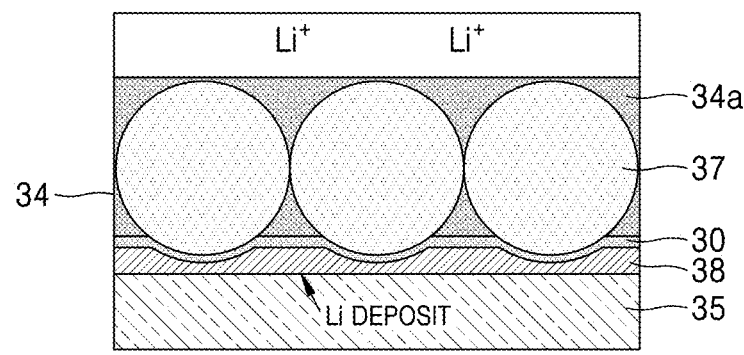

FIGS. 4A and 4B are schematic views of anodes for a lithium metal battery according to embodiments, describing a protective function of a protective layer for the anode.

Referring to FIG. 4A, an anode for a lithium metal battery according to an embodiment may have a structure including a solid-electrolyte interphase (SEI) 36 on a lithium metal electrode 35, and a protective layer 34 on the SEI 37, the protective layer 34 including particles 37. The lithium metal electrode 35 and the SEI 36 may have flexible characteristics due to, for example, a small thickness, and thus may be compressed by the particles 37. As a result, grooves may be formed on the lithium metal electrode 35 and the SEI 36.

The grooves may have a maximum depth of, for example, about ±1 μm. A crosslinked material 34a of a polymerizable compound may be in the spaces between the particles 37. Due to the crosslinked material of the polymerizable compound 34a, the protective layer 34 may have further increased mechanical strength.

In an embodiment as shown in FIG. 4B, the particles 37 may include, for example, crosslinked polystyrene (PS) microspheres. The pressing force of the particles 37 may inhibit lithium dendritic growth and may guide a lithium dendrite to grow in the spaces between the particles 37 (as illustrated by the arrows in FIG. 4A). When an anode including the protective layer 34 is charged, lithium deposition may occur, so that a lithium deposit layer 38 may be formed on the lithium metal electrode 35, as illustrated in FIG. 4B, resulting in a stack structure in which the lithium deposit layer 38, the SEI 36, the protective layer 34 including the particles 37 and the crosslinked material 34a of a polymerizable compound are sequentially stacked upon one another in the stated order.

The particles 37 in the protective layer may be hydrophobic, and the crosslinked material 34a of a polymerizable compound may serve as a hydrophilic ion conductor, so that the formation of the lithium dendrite may be more effectively suppressed.

Without being limited by theory, it is believed that when using a protective layer according to an embodiment as described above, an anode may have an improved lithium deposition density. In addition, the network and pore structure of the protective layer may serve as a space for dendritic growth and simultaneously may control the dendritic growth, and thus may absorb byproducts from a cathode. Therefore, a lithium metal battery including such a protective layer on an anode may have improved lifetime and improved high-temperature stability.

Figure 3A:
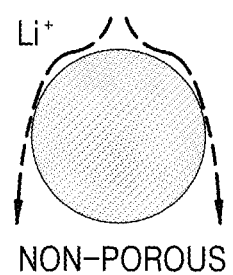
FIGS. 3A to 3D illustrate embodiments of shapes of a particle in a protective layer.
Figure 3B:
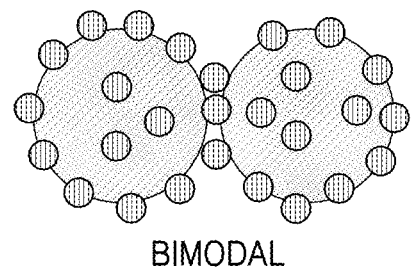
Figure 3C:
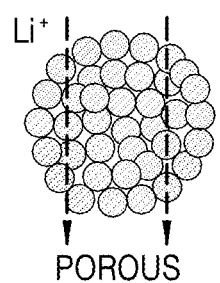
Figure 3D:
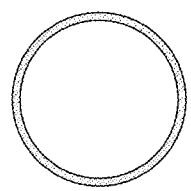

The particles in the protective layer and/or the particles in the solid electrolyte layer of the composite electrolyte structure of FIGS. 1 and 2 may have a non-porous, porous, or hollow structure, as illustrated in FIGS. 3A, 3C, and 3D. The first particles 17 and 27, respectively, may also have a bimodal structure as shown in FIG. 3B, including large-diameter particles and small-diameter particles.

The polymerizable compound is an oligomer having a crosslinkable functional group may have a weight average molecular weight of about 5,000 Daltons or less, and in some embodiments, about 2,000 Daltons or less, and in some other embodiments, about 1,000 Daltons or less, and in some other embodiments, about 200 Daltons to about 1,000 Daltons, and in still other embodiments, about 200 Daltons to about 500 Daltons. When the polymerizable compound has a weight average molecular weight within these ranges, the polymerizable compound may be in an easily injectable form such as liquid form or being soluble in a solvent. The polymerizable compound may have a low viscosity of about 3 centipoise (cP) to about 50 cP, or about 3 cP to about 30 cP, or about 3 cP to about 20 cP. When the polymerizable compound has a viscosity within this range, a composition including the polymerizable compound may easily permeate between the particles of the protective layers and fill the gaps between the particles in the protective layer, so that the protective layer may have improved strength.

For example, the polymerizable compound may include diethylene glycol diacrylate (DEGDA), triethylene glycol diacrylate (TEGDA), tetraethylene glycol diacrylate (TTEGDA), polyethylene glycol diacrylate (PEGDA), dipropylene glycol diacrylate (DPGDA), tripropylene glycol diacrylate (TPGDA), ethoxylated trimethylolpropane triacrylate (ETPTA), acrylate-functionalized ethylene oxide, 1,6-hexanediol diacrylate, ethoxylated neopentyl glycol diacrylate (NPEOGDA); propoxylated neopentyl glycol diacrylate (NPPOGDA), allyl methacrylate (ALMA), trimethylolpropane triacrylate (TMPTA), trimethylolpropane trimethacrylate (TMPTMA), pentaerythritol triacrylate (PETA), ethoxylated propoxylated trimethylolpropane triacrylate (TMPEOTA)/(TMPPOTA), propoxylated glyceryl triacrylate (GPTA)/(GPPOTA), tris(2-hydroxyethyl) isocyanurate triacrylate (THEICTA), pentaerythritol tetraacrylate (PETTA), dipentaerythritol pentaacrylate (DPEPA), or a combination thereof.

The crosslinked material of a polymerizable compound may have a weight average molecular weight of about 10,000 Daltons (Da) to about 300,000 Da, or about 10,000 Da to about 250,000 Da, or about 10,000 Da to about 100,000 Da. The crosslinked material may have a degree of crosslinking of, for example, about 90% or more, for example, about 75% to about 100%, or about 90% to about 100%, or about 95% to about 100%.

The polymerizable compound and the crosslinked material of the polymerizable compound may have ionic conductivity. When the polymerizable compound and the crosslinked material of the polymerizable compound have ionic conductivity, the protective layer may have further improved conductivity.

In some embodiments, the amount of the crosslinked material of a polymerizable compound in the protective layer may be from about 10 parts by weight to about 50 parts by weight, and in some embodiments, about 20 parts by weight to about 40 parts by weight, and in other embodiments, about 30 parts by weight to about 40 parts by weight, based on 100 parts by weight of the particles in the protective layer. When the amount of the crosslinked material of a polymerizable compound in the protective layer is within these ranges, the protective layer may have improved mechanical properties.

In some embodiments, the protective layer may further include, in addition to the particle (also referred to as a "first particle") comprising an organic particle, inorganic particle, organic-inorganic particle, or a combination thereof and having a size of greater than 1 μm and about 100 μm, a second particle having a smaller size than the first particle. In some embodiments, the protective layer may further include a plurality of particles having different sizes, in addition to the second particle. Accordingly, the particle size distribution of the plurality of particles may be bimodal.

The second particle in the protective layer has a smaller particle size than the first particle, and the second particle in the protective layer may have a particle size of about 1 to less than 100 μm. In other embodiments, the second particle in the protective layer may have a particle size of about 1 μm to about 50 μm, or about 10 μm to about 10 μm, or about 1.1 μm to about 3 μm, or about 1.1 μm to about 1.5 μm, or about 1.1 to about 1.3 μm. For example, the first particle in the protective layer may have a size of about 3 μm, and the second particle in the protective layer may have a size of about 1 μm. A weight ratio of the first particle to the second particle is not specifically limited, and may be, for example, about 1:99 to about 99:1, and in some embodiments, about 10:1 to about 2:1, and in other embodiments, about 1:1.

The protective layer may have a Young's modulus of about $10^6$ Pa or greater, or about $10^7$ Pa or greater, or about $10^8$ Pa or greater, or about $10^9$ Pa or greater, for example, about $10^6$ Pa to about $10^{12}$ Pa, or about $10^7$ Pa to about $10^{11}$ Pa, or about $10^8$ to about $10^{10}$ Pa. When the protective layer has a Young's modulus within these ranges, the protective layer may have good tensile strength and good mechanical properties.

A Young's modulus is used as a measure of the stiffness of the protective layer and may have the same meaning with as a "tensile modulus." The tensile modulus of the protective layer may be measured according to ASTM D412 using a dynamic mechanical analysis system (e.g., a TA Instruments DMA800 dynamic mechanical analyzer, available from TA Instruments) as follows. Protective layer samples are prepared according to the ASTM D412 standard (Type V specimens), and variations in strain with respect to stress in a protective layer sample are measured at about 25° C., a relative humidity of about 30%, and a rate of 5 millimeters (mm) per minute, thereby to obtain a stress-strain curve. The tensile modulus of the protective layer sample is calculated from the slope of the stress-strain curve.

The particle in the protective layer may have a chemically cross-linked structure or a physically cross-linked structure. The particle in the protective layer having a chemically or physically cross-linked structure may include, for example, an organic particle of a cross-linked polymer obtained from a polymer having a cross-linkable functional group, an inorganic particle having a crosslinked structure due to a cross-linkable functional group on a surface thereof, or the like, or may be a combination thereof. The cross-linkable functional group, which is involved in cross-linking reaction, may be, for example, an acryl group, a methacryl group, a vinyl group, or the like.

A particle having a chemically cross-linked structure refers to a particle in which cross-linking has occurred using chemical methods (e.g., chemical agents) to facilitate chemical bonding of cross-linkable functional groups present in the material. A particle having a physically cross-linked structure refers to a particle in which cross-linking has occurred using physical methods, for example, heating a polymer forming the particle until it reaches its glass transition temperature (Tg), in order to facilitate bonding of cross-linkable functional groups, i.e., cross-links which are not formed using chemical agents. The cross-linking may occur within the particle itself, between adjacent particles in the protective layer, or may be a combination thereof.

The lithium metal or lithium metal alloy of the lithium metal electrode may have a thickness of about 100 μm or less, and in some embodiments, about 80 μm or less, or about 50 μm or less, or about 30 μm or less, or about 20 μm or less, and in some other embodiments, about 0.1 μm to about 60 μm. For example, the lithium metal or lithium metal alloy may have a thickness of about 1 μm to about 25 μm, and in some embodiments, about 5 μm to about 20 μm.

The shape of the particle in the protective layer may include a spherical shape, a microsphere shape, a rod shape, an elliptical shape, a radial shape, or the like. A combination comprising at least one of the foregoing may also be used. When the particle in the protective layer has a spherical shape, the particle in the protective layer may be a microsphere having an average particle diameter of greater than 1 μm to about 100 μm. The microspheres may have an average particle diameter of about 1.5 μm to about 75 μm, about 1.5 μm to about 50 μm, for example, 1.5 μm to about 30 μm, about 1.5 μm to about 10 μm.

Figure 15A:
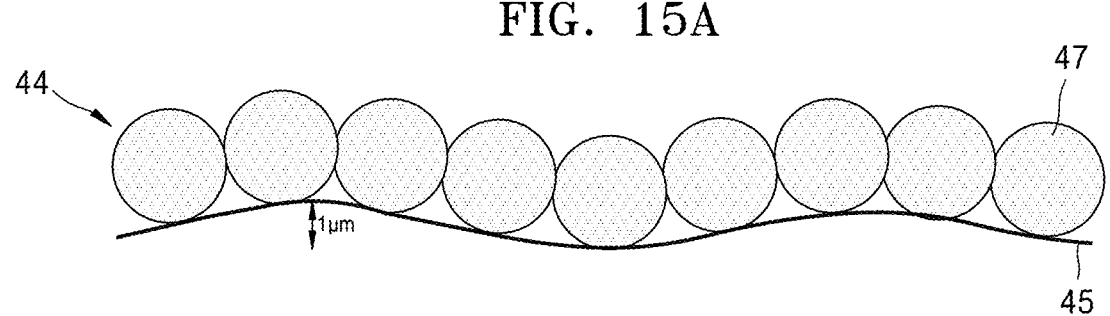
FIG. 15A describes a protective function of an embodiment of a protective layer of an anode in an embodiment of a lithium metal battery, in which the protective layer includes microspheres having an average particle diameter of greater than 1 μm to about 100 μm.
Figure 15B:
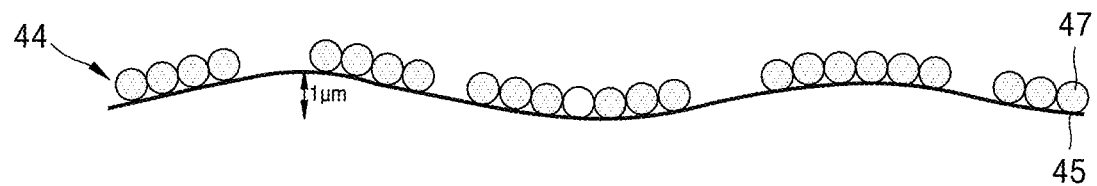
FIG. 15B describes a protective function of a protective layer of an anode in a lithium metal battery, the protective layer including microspheres having an average particle diameter of about 1 μm or less.

FIG. 15A is a schematic view of an anode for a lithium metal battery according to an embodiment, and illustrates a protective function of a protective layer for a lithium metal electrode in the anode, when the particle in the protective layer comprises a microsphere having a particle diameter greater than about 1 μm to about 100 μm. FIG. 15B is a schematic view of a negative electrode for a lithium metal battery, illustrating a protective function of a protective layer for a lithium metal electrode in an anode for a lithium metal battery, when microspheres in the protective layer have an average particle diameter of about less than 1 μm.

Referring to FIGS. 15A and 15B, a protective layer 44 including microspheres 47 may be stacked on a lithium metal electrode 45. A surface coating fraction of the microspheres 47 in the protective layer 44 of the lithium metal electrode 45 and the gap between the microspheres 47 are factors which directly impact the protective function of the protective layer 44 of the lithium metal electrode 45. The surface coating fraction refers to the portion of the surface of the lithium metal electrode which includes the protective layer relative to a total surface area of the lithium metal electrode. The surface coating fraction may be about 80%, or about 85%, or about 90%, or about 95%, or about 100% of the total surface area of the lithium metal electrode The lithium metal electrode 45 may be, for example, a lithium metal. As shown in FIG. 15B, the lithium metal electrode 45 may be thin enough to have soft characteristics with a thickness of, for example, about 5 μm to about 50 μm, about 10 μm to about 30 μm, or about 15 μm to about 25 μm. The lithium metal electrode 45 may have a surface step difference of about ±1 μm. To protect the lithium metal electrode 45 having such a surface step difference, it may be effective to use the microspheres 47 having an average particle diameter greater than 1 μm to about 100 μm in the protective layer 44.

Also, as illustrated in FIG. 15B, when the protective layer 44 on the lithium metal electrode 45 includes microspheres 47 having an average particle diameter of less than 1 μm, for example, about 5 nanometers (nm) to about 300 nm, the aggregation and surface coating fraction of the microspheres may be poor, so that the protective layer 44 may have an increased porosity, and liquid electrolyte may be more likely contact the lithium metal.

The particle size may mean an average particle diameter when the particle in the protective layer 44 is of a spherical shape, or may mean a length of the major axis when the particle in the protective layer 44 has a rod shape. For example, when the particle in the protective layer 44 has a rod shape, a minor axis to major axis ratio of the particle may be, for example, about 1:1 to about 1:30, or about 1:2 to about 1:25, or about 1:5 to about 1:20.

The particle in the protective layer 44 may include any polymer that may be suitable to form a protective layer.

In some embodiments, the particle in the protective layer 44 may include a polymer having low wettability against a liquid electrolyte.

The particle in the protective layer may include a polystyrene homopolymer, a copolymer including a styrene repeating unit, a copolymer including a repeating unit having a cross-linkable functional group, a cross-linked polymer, or a combination thereof.

For example, the particle in the protective layer may comprise a polymer, e.g., a homopolymer or a copolymer, including a styrene repeating unit. When the particle in the protective layer is a polymer including a styrene repeating unit, which is hydrophobic and is essentially not wetted by the electrolyte, the polymer does not adversely affect the lithium metal electrode, and then the reactivity of the lithium metal electrode with the electrolyte may be suppressed.

The particle in the protective layer may include a polymer including a homopolystyrene, a poly(styrene-divinylbenzene) copolymer, a poly(methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, a poly(styrene-ethylene-butylene-styrene) copolymer, a poly(styrene-methyl methacrylate) copolymer, a poly(styrene-acrylonitrile) copolymer, a poly(styrene-vinylpyridine) copolymer, a poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly((C1-C9 alkyl) methacrylate-butadiene-styrene) copolymer, a poly(styrene-(C1-C9 alkyl) acrylate) copolymer, and a poly(acrylonitrile-styrene-(C1-C9 alkyl) acrylate) copolymer; a cross-linked polymer thereof; or a combination thereof.

Examples of the cross-linked polymer include, for example, a poly(styrene-divinylbenzene) copolymer, a poly(methyl methacrylate-divinylbenzene), a cross-linked product of poly(styrene-divinylbenzene) copolymer, or a cross-linked product of a poly(methyl methacrylate-divinylbenzene). A combination comprising at least one of the foregoing polymers may also be used.

In a copolymer including a styrene repeating unit, the amount of the styrene repeating unit may be from about 65 parts by weight to about 99 parts by weight, and in some embodiments, about 80 parts by weight to about 99 parts by weight, and in some embodiments, about 90 parts by weight to about 99 parts by weight, and in some other embodiments, about 96 parts by weight to about 99 parts by weight, based on 100 parts by weight of the copolymer.

In a copolymer including a divinylbenzene as a repeating unit, the amount of divinylbenzene may be from about 1 part by weight to about 35 parts by weight, and in some embodiments, about 1 part by weight to about 20 parts by weight, and in some embodiments, about 1 part by weight to about 10 parts by weight, and in some other embodiments, about 1 part by weight to about 4 parts by weight, and in some other embodiments, about 3 parts by weight to about 7 parts by weight, and in still other embodiments, about 5 parts by weight, based on 100 parts by weight of the copolymer.

The above-listed copolymers may include a block copolymer, a random copolymer, an alternating copolymer, a graft copolymer, and the like. A combination comprising at least one of the foregoing may also be used. These copolymers may have a weight average molecular weight of about 10,000 Daltons to about 200,000 Daltons. The above-listed copolymers may be, for example, a block copolymer.

In a block copolymer including a plurality of blocks, the blocks may be sequentially referred to as a first block including a first repeating unit, a second block including a second repeating unit, a third block including a third repeating unit, or the like.

In the block copolymer, a first block including a first repeating unit may have a weight average molecular weight of about 10,000 Daltons or greater, and in some embodiments, about 10,000 Daltons to 500,000 Daltons, and in some other embodiments, about 15,000 Daltons to 400,000 Daltons, and in some embodiments about 20,000 to about 200,000 Daltons. The amount of the block including the first repeating unit may be about 20 parts by weight to about 50 parts by weight, for example, about 20 parts by weight to about 40 parts by weight, or for example, about 22 parts by weight to about 30 parts by weight, based on 100 parts by weight of the block copolymer. When using such a polymer block, the protective layer may have good mechanical properties, for example, improved strength.

In the block copolymer, a second block including a second repeating unit may have a weight average molecular weight of about 10,000 Daltons or greater, and in some embodiments, about 10,000 Daltons to about 500,000 Daltons, and in some other embodiments, about 15,000 Daltons to 400,000 Daltons. When using a hard block having a weight average molecular weight within these ranges, the protective layer may have improved ductility, elasticity, and strength characteristics.

The block copolymer may include a diblock copolymer (A-B), a triblock copolymer (A-B-A' or B-A-B'), or a combination thereof.

In a triblock copolymer including a first block (A), a second block (B), and a third block (C), a total amount of the first and third blocks may be about 20 parts by weight to about 35 parts by weight, and in some embodiments, about 22 parts by weight to about 30 parts by weight, based on 100 parts by weight of the triblock copolymer, and the amount of the second block may be about 65 parts by weight to about 80 parts by weight, and in some embodiments, about 70 parts by weight to about 78 parts by weight, based on 100 parts by weight of the triblock copolymer.

The particle in the protective layer may include a polyvinyl pyridine, a polyvinyl cyclohexane, a polyglycidyl acrylate, a poly(2,6-dimethyl-1,4-phenylene oxide), a polyolefin, a poly(tert-butyl vinyl ether), a polycyclohexyl vinyl ether, a polyvinyl fluoride, a poly(styrene-co-maleic anhydride) copolymer, a polyglycidyl methacrylate, a polyacrylonitrile, a polymeric ionic liquid (PIL), or a combination thereof.

The particle in the protective layer may include a poly(styrene-divinylbenzene) copolymer, a poly(methyl methacrylate-divinylbenzene) copolymer, a poly(ethyl methacrylate-divinylbenzene) copolymer, a poly(pentyl methacrylate-divinylbenzene) copolymer, a poly(butyl methacrylate-divinylbenzene) copolymer, a poly(propyl methacrylate-divinylbenzene) copolymer, a poly(methyl acrylate-divinylbenzene) copolymer, a poly(ethyl acrylate-divinylbenzene) copolymer, a poly(pentyl acrylate-divinylbenzene) copolymer, poly(butylacrylate-divinylbenzene) copolymer, a poly(propyl acrylate-divinylbenzene) copolymer, a poly(acrylonitrile-butadiene-styrene) copolymer, or a combination thereof.

When the particle in the protective layer includes a cross-linked polymer as described above, the individual particles are connected due to cross-linking between the particles, and as a result, the protective layer may have improved mechanical strength. The protective layer may have a degree of crosslinking of about 10% to 30%, for example, about 12% to 28%, or for example about 15% to about 25%.

In some embodiments, the protective layer may include a liquid electrolyte. When the protective layer includes a liquid electrolyte, the liquid electrolyte may form ion conducting paths so that the anode may have improved conductivity. Thus, a lithium metal battery with stable cycle characteristics may be manufactured using an anode including the protective layer.

The liquid electrolyte may include an organic solvent, an ionic liquid, and a lithium salt. The liquid electrolyte may occupy about 30 volume percent (%) to 60 volume % of the total volume of the protective layer. For example, the liquid electrolyte may occupy about 35 volume % to about 55 volume %, about 40 volume % to about 50 volume % of total volume of the protective layer.

In some embodiments, the particle in the protective layer may have a particle size of about 1.1 μm to about 50 μm, and in some embodiments, about 1.3 μm to about 50 μm, and in some other embodiments, about 1.5 μm to about 10 μm.

In some embodiments, the particle in the protective layer may include a large-diameter particle having a size of about 3 μm and a small-diameter particle having a size of about 1.3 μm. A weight ratio of the large-diameter particles to the small-diameter particles may be, for example, about 4:1 to 9:1 by weight, or may be about 5:1, or about 6:1, or about 7:1, or about 8:1.

Structures of anodes for lithium metal batteries, according to exemplary embodiments, are further described below.

An anode according to an embodiment may include a lithium metal electrode deposited on a current collector, wherein the lithium metal electrode may include lithium metal or a lithium metal alloy. The protective layer may be disposed on the lithium metal electrode. The protective layer may include the particle. The particle in the protective layer may form a monodisperse layer without aggregation.

A crosslinked material of a polymerizable compound may be between the particles of the protective layer. The crosslinked material of the polymerizable compound may be in the gaps between the particles, so that the protective layer may have an integrated structure of the cross-linked material and the particles, and as a result, may have improved mechanical properties. Thus, using the protective layer having such a structure in an anode may more effectively suppress growth of lithium dendrites, improve lithium deposition density during charge and discharge of a lithium metal battery, and may provide improved conductivity characteristics.

When the crosslinked material of the polymerizable compound has suitable ionic conductivity, ions may also be transferred through the crosslinked material. When an anode includes such a protective layer, the anode may have improved ionic conductivity.

The lithium metal alloy may include a lithium metal and a metal/metalloid alloyable with lithium metal or an oxide of the metal/metalloid. Examples of the metal/metalloid alloyable with lithium metal or an oxide of thereof include Si, Sn, Al, Ge, Pb, Bi, Sb, a Si—Y' alloy (wherein Y' may be an alkaline metal, an alkaline earth metal, a Group 13 to 16 element, a transition metal, a rare earth element, or a combination thereof, except for Si), a Sn—Y' alloy (wherein Y' may be an alkaline metal, an alkaline earth metal, a Group 13 to 16 element, a transition metal, a rare earth element, or a combination thereof, except for Sn), $MnO_x$ (wherein $0 \le x \le 2$), or a combination thereof.

Y' may include magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), thallium (Tl), germanium (Ge), phosphorus (P), arsenic (As), antimony (Sb), bismuth (Bi), sulfur (S), selenium (Se), tellurium (Te), polonium (Po), or a combination thereof. For example, the oxide of a metal/metalloid alloyable with lithium metal may be a lithium titanium oxide, a vanadium oxide, a lithium vanadium oxide, $SnO_2$, $SiO_x$ (wherein $0<x<2$), or the like. A combination comprising at least one of the foregoing may also be used.

The particle may be surrounded by an ion conductive polymer. The crosslinked material of the polymerizable compound and a liquid electrolyte may be present in the gaps between the particles.

The ion conductive polymer, which may be in the protective layer, may surround the particles. The ion conductive polymer may improve the mechanical strength of the protective layer and may serve as a binder that may adhere the particles to an upper surface of the lithium metal electrode. The amount of the ion conductive polymer may be about 10 parts by weight or less, and in some embodiments, about 5 parts by weight or less, or about 2 parts by weight or less, and in some other embodiments, may be about 1 part by weight to about 10 parts by weight, or about 1 part by weight to about 5 parts by weight, about 1 to 2 parts by weight, based on 100 parts by weight of the particle. When the amount of the ion conductive polymer is within these ranges, the protective layer may have good mechanical strength and effectively suppress growth of lithium dendrite.

The ion conductive polymer may include any polymer having ionic conductivity and which is suitable for use in a lithium metal battery, for example, a homopolymer, a copolymer, or a combination thereof For example, the homopolymer may be a homopolystyrene, polyvinylidene fluoride, polymethyl methacrylate, polyvinyl alcohol, or the like. A combination comprising at least one of the foregoing may also be used.

The copolymer as the ion conductive polymer may be a block copolymer, a random copolymer, a graft copolymer, an alternating copolymer, or a combination thereof.

The ion conductive polymer may include a block copolymer including a styrene repeating unit. For example, the ion conductive polymer may include homopolystyrene, a poly(styrene-divinylbenzene) block copolymer, a poly(styrene-isoprene) block copolymer, a poly(styrene-isoprene-styrene) block copolymer, a poly(styrene-butadiene) block copolymer, a poly(styrene-butadiene-styrene) block copolymer, a poly(styrene-ethylene-butylene-styrene) block copolymer, a poly(styrene-methyl methacrylate) block copolymer, a poly(styrene-acrylonitrile) block copolymer, a poly(styrene-vinylpyridine) block copolymer, poly(acrylonitrile-butadiene-styrene) copolymer, a poly(acrylonitrile-ethylene-propylene-styrene) copolymer, a poly(methyl methacrylate-acrylonitrile-butadiene-styrene) copolymer, a poly((C1-C9 alkyl) methacrylate-butadiene-styrene) copolymer, a poly(styrene-(C1-C9 alkyl) acrylate) copolymer, a poly(styrene-ethyleneoxide-styrene) block copolymer, a poly(acrylonitrile-styrene-(C1-C9 alkyl) acrylate) copolymer, or a combination thereof.

For example, the poly(styrene-divinylbenzene) copolymer may be a polymer represented by Formula 1.

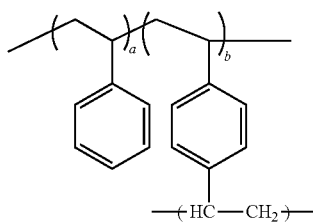

Formula 1

In Formula 1, a and b are mole fractions and are each independently from 0.01 to 0.99, wherein the sum of a and b is equal to 1. In Formula 1, a may be from 0.6 to 0.99, or 0.7 to 0.96, or 0.75 to 0.90; and b may be from 0.01 to 0.4, or 0.04 to 0.3, or 0.1 to 0.25.

For example, the poly(styrene-divinylbenzene) copolymer may be a polymer represented by Formula 1a.

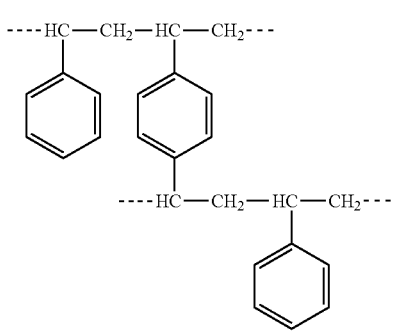

Formula 1a

For example, the poly(styrene-divinylbenzene) copolymer may be a polymer represented by Formula 1b.

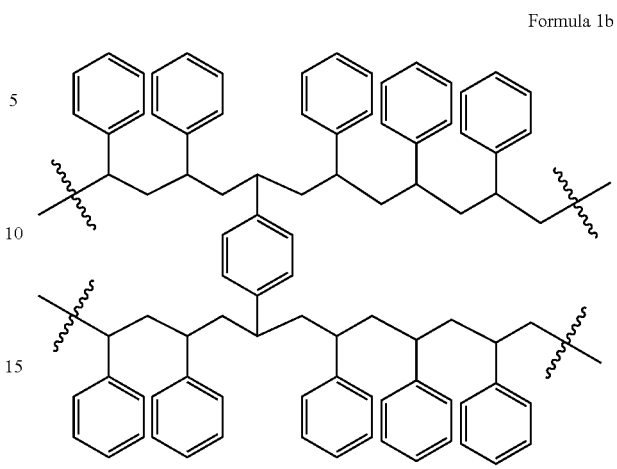

Formula 1b

The poly(styrene-divinylbenzene) copolymer may have a weight ratio of polystyrene block to polydivinylbenzene block of about 3:1 to 9:1, and in some embodiments, about 3:1, about 4:1, about 5:1, about 6:1, about 7:1, about 8:1, or about 9:1 by weight.

The poly(acrylonitrile-butadiene-styrene) copolymer may be a polymer represented by Formula 2.

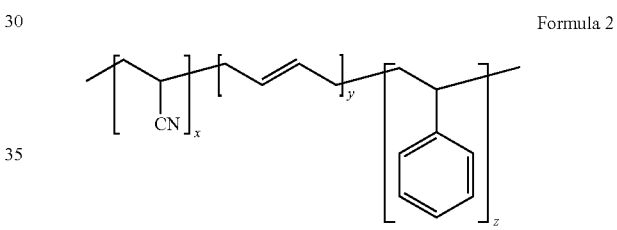

Formula 2

In Formula 2, x, y, and z are mole fractions and may be each independently from 0.01 to 0.99, wherein the sum of x, y, and z may be equal to 1.

In Formula 2, x may be from 0.1 to 0.35, y may be from 0.05 to 0.55, and z may be from 0.2 to 0.7. For example, x may be from 0.15 to 0.35, y may be from 0.05 to 0.3, and z may be from 0.4 to 0.6.

The poly(acrylonitrile-butadiene-styrene) copolymer may have a weight ratio of a polyacrylonitrile block, a polybutadiene block, and a polystyrene block of about 0.25:0.25:0.5, about 0.3:0.3:0.4, about 0.2:0.2:0.6, about 0.35:0.35:0.3, or about 0.1:0.1:0.8.

The poly(styrene-divinylbenzene) copolymer represented by Formula 1 and the poly(acrylonitrile-butadiene-styrene) copolymer represented by Formula 2 may each independently have a degree of polymerization of about 2 to about 5,000, about 3 to about 2,000, for example, about 5 to about 1,000.

For example, the poly(styrene-divinylbenzene) copolymer represented by Formula 1 and the poly(acrylonitrile-butadiene-styrene) copolymer represented by Formula 2 may be a block copolymer.

In some embodiments, the protective layer 14, 24 may have a single layer structure of the first particles 17 and 27, respectively, as illustrated in FIGS. 1 and 2.

In some other embodiments, the protective layer may have a double layer structure in which the particles are stacked to provide a double layer on the lithium metal electrode. The particles stacked as a double layer may also be surrounded by the ion conductive polymer, and the crosslinked material of the polymerizable compound may be in the gaps between the particles. In some other embodiments, the protective layer may have a multilayer structure in which particles having different sizes may be mixed together with the polymerizable oligomer. When the protective layer has such a multilayer structure in which the particles having different sizes are mixed together, the space for dendritic growth may be suppressed by lowering porosity or improving packing density of the protective layer and thus minimizing contact between the electrolyte and the lithium metal. The dendritic growth may also be suppressed by increasing the thickness of the protective layer.

The particle of the protective layer may include, for example, a poly(styrene-divinylbenzene) copolymer. When the particle of the protective layer includes a cross-linked polymer as described above, the particle may be covalently linked to one another, and thus form a high-intensity microsphere network structure.

The protective layer may have a porosity of about 5% or less, for example, about 0.01% to about 5%. A pore size of the protective layer may be determined depending on the size of the particle.

In the protective layer according to any of the above-described embodiments, substantially no agglomeration of the particles occurs, and as a result, the protective layer may have a uniform thickness. The protective layer may have a thickness of about 1 μm to about 10 μm, for example, about 2 μm to about 9 μm, or about 3 μm to about 8 μm. A thickness deviation of the protective layer 12 may be from 0.1 μm to 4 μm, and in some embodiments, 0.1 μm to 3 μm, and in some other embodiments, 0.1 μm to 2 μm.

The protective layer further include a liquid electrolyte. The liquid electrolyte includes a lithium salt and an organic solvent. The lithium salt of the liquid electrolyte in the protective layer 12 may include, for example, LiSCN, LiN(CN)$_2$, LiClO$_4$, LiBF$_4$, LiAsF$_6$, LiPF$_6$, LiCF$_3$SO$_3$, LiC(CF$_3$SO$_2$)$_3$, LiN(SO$_2$C$_2$F$_5$)$_2$, LiN(SO$_2$CF$_3$)$_2$, LiN(SO$_2$F)$_2$, LiSbF$_6$, LiPF$_3$(CF$_2$CF$_3$)$_3$, LiPF$_3$(CF$_3$)$_3$, LiB(C$_2$O$_4$)$_2$, or a combination thereof.

The amount of the lithium salt in the protective layer 2 may be from about 10 parts by weight to about 70 parts by weight, or about 15 parts by weight to about 60 parts by weight, and in some embodiments, about 20 to 50 parts by weight, based on 100 parts by weight of the particles. When the amount of the lithium salt is within these ranges, the protective layer may have suitable ion conductivity.

The organic solvent of the liquid electrolyte in the protective layer may include a carbonate compound, a glyme compound, and a dioxolane compound. For example, the carbonate compound may be ethylene carbonate, propylene carbonate, dimethyl carbonate, fluoroethylene carbonate, diethyl carbonate, or ethyl methyl carbonate. A combination comprising at least one of the foregoing may also be used.

The glyme compound may include, for example, poly(ethylene glycol)dimethyl ether (PEGDME; polyglyme), tetra(ethylene glycol)dimethyl ether (TEGDME; tetraglyme), tri(ethylene glycol)dimethyl ether (triglyme), poly(ethylene glycol) dilaurate (PEGDL), poly(ethylene glycol) monoacrylate (PEGMA), and poly(ethylene glycol) diacrylate (PEGDA), or a combination thereof.

The dioxolane compound may include, for example 1,3-dioxolane, 4,5-diethyl-1,3-dioxolane, 4,5-dimethyl-1,3-dioxolane, 4-methyl-1,3-dioxolane, and 4-ethyl-1,3-dioxolane. For example, the organic solvent may be 2,2-dimethoxy-2-phenyl acetophenone, dimethylether (DME), 1,2-dimethoxyethane, 1,2-diethoxyethane, tetrahydrofuran, gamma-butyrolactone, 1,1,2,2-tetrafluoroethyl 2,2,3,3-tetrafluoropropyl ether, or the like, or a combination thereof.

For example, the organic solvent may include ethylene carbonate, propylene carbonate, dimethyl carbonate, diethyl carbonate, ethyl methyl carbonate, fluoroethylene carbonate, gamma-butyrolactone, 1,2-dimethoxyethane, 1,2-diethoxyethane, dimethylene glycol dimethyl ether, trimethylene glycol dimethyl ether, tetramethylene glycol dimethyl ether, polyethylene glycol dimethyl ether, succinonitrile, sulfolane, dimethyl sulfone, ethyl methyl sulfone, diethyl sulfone, adiponitrile, 1,1,2,2-tetrafluoroethyl 2,2,3,3-tetrafluoropropyl ether, or a combination thereof.

In some embodiments, a lithium metal battery using an anode according to any of the above-described embodiments may have a lithium deposition density of about 0.3 grams per cubic centimeter (g/cm$^3$) to about 0.4 g/cm$^3$, for example, about 3.12 g/cm$^3$ to about 0.4 g/cm$^3$, for example, about 0.325 g/cm$^3$ to about 0.4 g/cm$^3$, under a non-pressure condition, wherein the lithium deposition density refers to a density of lithium which is deposited on the anode during charge. The term "non-pressure condition" refers to the condition in which no external pressure is applied to an external surface of the lithium metal battery, e.g., by a substrate such as a glass plate.

In some embodiments, a lithium metal battery including an anode according to any of the above-described embodiments may have a lithium deposition density increase of about 50% or greater, or 55% or greater, or 58% or greater, for example, about 50% to about 75%, or about 50 to 60%, with respect to a lithium metal battery using bare lithium metal as an anode. This remarkable improvement in lithium deposition density is attributed to the protective layer having high strength in the anode. The protective layer may have a Young's modulus of about $10^6$ Pa or greater, or about $10^7$ Pa or greater, or about $10^8$ Pa or greater, or about $10^9$ Pa or greater, for example, about 1 to about 15 gigapascals, or about 5 to about 10 GPa, or about 6 to about 8 gigapascals (GPa), at about 25° C.

When the protective layer has a Young's modulus within these ranges, the protective layer may effectively suppress volume change in the anode during charge, and the anode may be less likely to be partially broken by the formation of lithium dendrites on the surface of the lithium metal electrode and cause a short circuit.

An interfacial resistance between the lithium metal electrode and the protective layer, which may be obtained using a Nyquist plot through an impedance measurement may be decreased by at least about 10%, as measured at about 25° C., compared to bare lithium metal. The anode according to any of the above-described embodiments including the protective layer for the lithium metal electrode may have lower interfacial resistance and thus better interfacial characteristics, compared to a lithium metal electrode not including a protective layer. For example, the anode may have an oxidation current or reduction current of about 0.05 milli-Ampere per square centimeter (mA/cm$^2$) or less in a voltage range of about 0.0 volts (V) to about 6.0 V with respect to lithium metal.

When using a protective layer according to any of the above-described embodiments, a lithium metal battery may be substantially free of battery swelling issues after repeated charging and discharging. A lithium metal battery using a protective layer according to any of the embodiments may have a thickness change of about 20 μm to about 30 μm, for example about 21 μm to about 28 μm, for example, about 22 μm to about 27, after repeated charging and discharging. The thickness change may be smaller than the thickness change which occurs when using a bare lithium metal without the protective layer. For example, a lithium metal battery using a protective layer according to any of the above-described embodiments, may have a thickness changes which is at least about 20%, and in some embodiments, at least about 40%, and in some other embodiments, by about 40 to about 60% less than a thickness change which occurs when using a bare lithium metal without the protective layer.

A method of manufacturing an anode for a lithium metal battery, according to an embodiment, may be as follows.

First, a particle having a size of greater than 1 μm to about 100 μm is mixed with a solvent to prepare a protective layer-forming composition.

The protective layer-forming composition may be coated on a lithium metal electrode, and dried to form a pre-protective layer.

The solvent may be, for example, tetrahydrofuran, N-methylpyrrolidone, or the like. The amount of the solvent may be from about 100 parts by weight to about 5,000 parts by weight, based on 100 parts by weight of the particle.

An ion conductive polymer may be further added to the protective layer-forming composition.

An ionic liquid, a polymeric ionic liquid (PIL), a lithium salt, or a combination thereof may be further added to the protective layer-forming composition.

The coating may be performed using any suitable method used in the art, including for example, spin coating, roll coating, curtain coating, pressing, casting, screen printing, inkjet printing, doctor blade, or the like.

The drying may be performed at about 20° C. to about 25° C. When the drying is performed at such a low temperature within this temperature range, deformation of the lithium metal electrode may not occur. A protective layer having a monodisperse single layer structure through direct coating of the protective layer-forming composition on the lithium metal electrode may be formed, thereby improving efficiency in protective layer formation process. The resulting protective layer may also have good mechanical strength and improved ion conductivity.

After the drying, a composition including a polymerizable compound and a solvent may be coated on the dried pre-protective layer and then dried to thereby form an anode for a lithium metal battery. The coating of the composition including the polymerizable compound and the solvent may occur in one step or over multiple steps (e.g., two or more). The coating may be performed using, for example, spin coating, roll coating, curtain coating, pressing), casting, screen printing, inkjet printing, doctor blade, or the like.

Alternatively, instead of the coating, the pre-protective layer may be dipped into the composition including the polymerizable compound and the solvent.

In the composition including the polymerizable compound and the solvent, the solvent may be tetrahydrofuran, N-methylpyrrolidone, or the like. The amount of the solvent in the composition may be, for example, about 100 parts by weight to about 5,000 parts by weight, or about 150 parts by weight to about 2500 parts by weight, or about 200 parts by weight to about 2000 parts by weight, based on 100 parts by weight of the polymerizable oligomer. The amount of the polymerizable compound in the composition may be, for example, about 20 weight percent (wt %) to about 50 wt %, or about 15 parts by weight to about 35 parts by weight, or about 20 parts by weight to about 30 parts by weight, based on a total weight of the composition. The amount of the polymerizable compound may be, for example, about 10 to 40 parts by weight, based on 100 parts by weight of the particle having a particle size of greater than 1 μm to about 100 μm in the protective layer. The composition including the polymerizable compound and the solvent may have a viscosity of about 10 cP or less, or about 8 cP or less, or about 5 cP or less, for example, about 0.1 cP to 10 cP, or about 0.5 cP to about 7.5 cP, or about 2 cP to about 8 cP, which may easily permeate between the particles of the pre-protective layer and fill the gaps between the particles when cast on the pre-protective layer.

In the composition including the polymerizable compound and the solvent, the amount of the polymerizable compound may be about 10 parts by weight to about 40 parts by weight, or about 10 parts by weight to about 30 parts by weight, or about 20 parts by weight to about 30 parts by weight, based on 100 parts by weight of the particles of the protective layer. When the amount of the polymerizable compound is within this range, a crosslinked material of the polymerizable compound in the gaps of the particles may maintain high strength of the protective layer.

According to the above-described embodiments, an anode for a target lithium metal battery may be manufactured by coating a composition including the at least one particle having a size of greater than 1 μm to about 100 μm on a lithium metal electrode to form a pre-protective layer as a stack of the particles, and casting a composition including a polymerizable compound and a solvent on the pre-protective layer to thereby form the anode.

In some other embodiments of the method of manufacturing an anode, the protective layer of the anode may be formed in a single step using a composition including both the particle and a polymerizable compound combined together.

During the drying process following the coating of the composition including a polymerizable compound and a solvent on the pre-protective layer, cross-linking of the polymerizable compound may take place. The drying may be performed within a range of temperatures at which no deformation of the lithium metal electrode including a lithium metal or a lithium metal alloy occurs. The drying may be performed at a temperature of, for example, about 20° C. to 40° C. The polymerizable compound may be thermally crosslinked during the drying. A thermopolymerization initiator may be used to facilitate the thermal cross-linking reaction.

In some embodiments, the polymerizable compound may be crosslinked at about 20° C. to about 40° C. by light irradiation, for example, ultraviolet (UV) light irradiation. A photopolymerization initiator may be used for the photo-crosslinking reaction.

The photopolymerization initiator may be any compound capable of forming a radical when irradiated with light such as ultraviolet (UV) light. For example, the photopolymerization initiator may include 2-hydroxy-2-methyl-1-phenyl-propane-1-one (HMPP), benzoin ether, dialkyl acetophenone, hydroxyl alkylketone, phenyl glyoxylate, benzyl dimethyl ketal, acyl phosphine, α-aminoketone, or a combination thereof. For example, the acyl phosphine may be commercially available LUCIRIN® TPO, i.e., 2,4,6-trimethyl-benzoyl-trimethyl phosphine oxide.

The thermopolymerization initiator may include persulfate-based initiator, an azo-based initiator, and an initiator including hydrogen peroxide and ascorbic acid. Non-limiting examples of the persulfate-based initiator are sodium persulfate ($Na_2S_2O_8$), potassium persulfate ($K_2S_2O_8$), ammonium persulfate ($(NH_4)_2S_2O_8$). Non-limiting examples of the azo-based initiator are 2, 2-azobis(2-amidinopropane)dihydrochloride, 2,2-azobis-(N, N-dimethylene)isobutyramidine dihydrochloride, 2-(carbamoylazo) isobutylonitrile), 2,2-azobis[2-(2-imidazolin-2-yl)propane] dihydrochloride, 4,4-azobis-(4-cyanovaleric acid), and the like, or a combination thereof.

The amount of the photopolymerization initiator or thermopolymerization initiator may be about 0.005 parts by weight to about 5.0 parts by weight, or about 0.01 parts by weight to about 3 parts by weight, or about 0.5 parts by weight to about 2 parts by weight, based on 100 parts by weight of the polymerizable oligomer. When the amount of the photopolymerization initiator or thermopolymerization initiator is within this range, the degree of polymerization may be improved.

The drying of the composition including the polymerizable compound and the solvent on the pre-protective layer may be followed by roll-pressing. The porosity and pore size of the protective layer may be varied by the roll-pressing. The roll-pressing may further improve the current density and lithium deposition density of a final anode.

This roll-pressing may be performed under any conditions suitable for manufacturing batteries in the art. The roll-pressing may be performed, for example, at a pressure of about 1 to 1.5 kilograms-force per centimeter (kgf/cm).

The protective layer may have an oxidation current or a reduction current of about 0.05 mA/cm$^2$ or less in a voltage range of about 0 V to about 6 V with respect to lithium metal. The protective layer may be electrochemically stable in a voltage range of about 0 V to about 6 V, and in some embodiments, about 0 V to about 5 V, and in some other embodiments, about 0 V to about 4 V, with respect to lithium metal. In some embodiments, the protective layer may have an electrochemically stable wide voltage window, and thus may be applicable to an electrochemical device operating at a high voltage.

The particle in the protective layer may be an organic particle. The organic particle may include, for example, homopolystyrene, a poly(styrene-divinylbenzene) copolymer, or a combination thereof.

The particle in the protective layer may be an inorganic particle. The inorganic particle may include, for example, $SiO_2$, $TiO_2$, ZnO, $Al_2O_3$, $BaTiO_3$, or a combination thereof.

The particle in the protective layer may be an organic-inorganic particle. The organic-inorganic particle may include, for example, a cage-structured silsesquioxane, a metal-organic framework (MOF), or a combination thereof.

For example, the cage-structured silsesquioxane may be a polyhedral oligomeric silsesquioxane (POSS). The number of silicon atoms in the POSS may be about 8 or less, for example, 6 or 8. For example, the cage-structured silsesquioxane may be a compound represented by Formula 3.

In Formula 3, $R^1$, $R^2$, and $R^3$ may be each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

In Formula 3, 0<a<20, 0<b<20, 0<c<20, and k=a+b+c, provided that a, b, and c are selected in such a way that 65≤k≤20.

The cage-structured silsesquioxane may be a compound represented by Formula 4 or a compound represented by Formula 5.

Formula 4

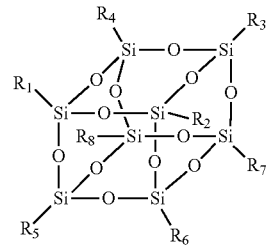

In Formula 4, $R_1$ to $R_8$ may be each independently a hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

Formula 5

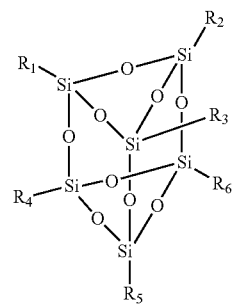

In Formula 5, $R_1$ to $R_6$ may be each independently a hydrogen, substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C2-C30 heteroaryl group, a substituted or unsubstituted C4-C30 carbocyclic group, or a silicon-containing functional group.

In some embodiments, $R_1$ to $R_8$ in Formula 4 and $R_1$ to $R_6$ in Formula 5 may be a an isopropyl group or isobutyl group. For example, the cage-structured silsesquioxane may be octaisobutyl-t8-silsesquioxane.

The metal-organic framework (MOF) may be a porous crystalline compound in which a Group 2 to Group 15 metal ion or a Group 2 to Group 15 metal ionic cluster is chemically bonded with an organic ligand. The organic ligand refers to an organic group that may form an organic bond such as a coordinate bond, ionic bond, or covalent bond. For example, an organic group having at least two binding sites for such metal ions as described above may form a stable structure through binding with the metal ions.

The Group 2 to Group 5 metal ion may include cobalt (Co), nickel (Ni), molybdenum (Mo), tungsten (W), ruthenium (Ru), osmium (Os), cadmium (Cd), beryllium (Be), calcium (Ca), barium (Ba), strontium (Sr), iron (Fe), manganese (Mn), chromium (Cr), vanadium (V), aluminum (Al), titanium (Ti), zirconium (Zr), copper (Cu), zinc (Zn), magnesium (Mg), hafnium (Hf), niobium (Nb), tantalum (Ta), rhenium (Re), rhodium (Rh), iridium (Ir), palladium (Pd), platinum (Pt), silver (Ag), scandium (Sc), yttrium (Y), indium (In), thallium (Tl), silicon (Si), germanium (Ge), tin (Sn), lead (Pb), arsenic (As), antimony (Sb), bismuth (Bi), or a combination thereof. The organic ligand may be a group derived from a compound including an aromatic dicarboxylic acid, an aromatic tricarboxylic acid, an imidazole-based compound, a tetrazole, 1,2,3-triazole, 1,2,4-triazole, pyrazole, an aromatic sulfonic acid, an aromatic phosphoric acid, an aromatic sulfinic acid, an aromatic phosphinic acid, a bipyridine, and a compound having at least one functional group selected from an amino group, an imino group, an amide group, a dithio carboxylic acid group (—$CS_2H$), a dithio carboxylate group (—$CS_2^-$), a pyridine group, a pyrazine group, or a combination thereof. A combination comprising at least one of the foregoing may also be used.

Non-limiting examples of the aromatic dicarboxylic acid and aromatic tricarboxylic acid are benzene dicarboxylic acid, benzene tricarboxylic acid, biphenyl dicarboxylic acid, and terphenyl-dicarboxylic acid.

For example, the organic ligand may be a group originating from compounds represented by Formula 6.

Formula 6

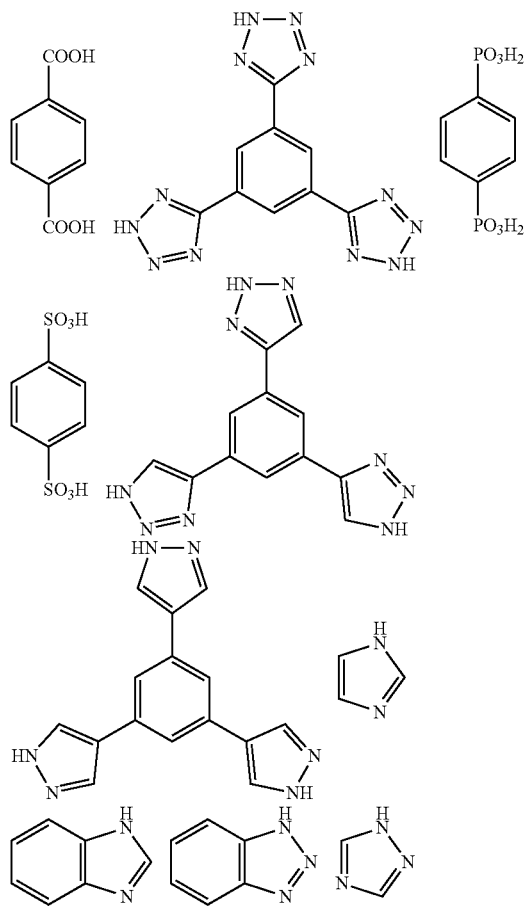

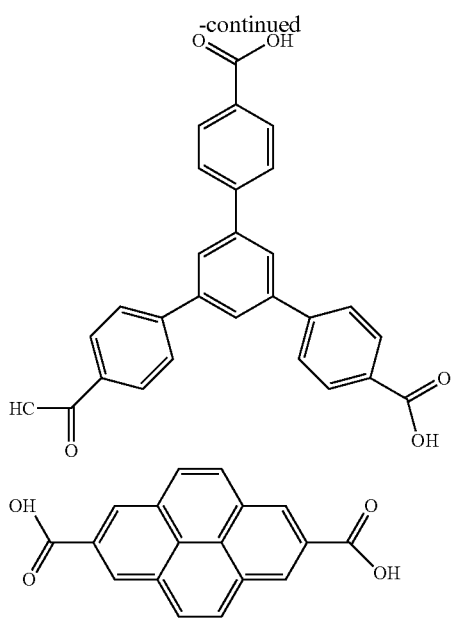

The metal-organic framework (MOF) may be, for example, $Ti_8O_8(UH)_4[O_2C—O_6H_4—CO_2]_6$, Cu (bpy) $(H_2O)_2(BF_4)_2$(bpy) {where bpy=4,4'-bipyridine}, $Zn_4O$ $(O_2C—C_6H_4—CO_2)_3$ (Zn-terephthalic acid-MOF, Zn-MOF), or $Al(OH)(O_2C—C_6H_4—CO_2)$. A combination comprising at least one of the foregoing may also be used The protective layer may include i) a first particle A including a cage-structured silsesquioxane, a metal-organic framework (MOF), $Li_{1+x+y}Al_xTi_{2-x}Si_yP_{3-y}O_{12}$ (wherein $0<x<2$ and $0\leq y<3$), $Pb(Zr_{1-x}Ti_x)O_3$ (PZT, wherein $0\leq x\leq 1$), $Pb_{1-x}La_xZr_{1-y}Ti_yO_3$(PLZT, wherein $0\leq x<1$ and $0\leq y<1$), $Pb(Mg_{1/3}Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, SiC, lithium phosphate (e.g., $Li_3PO_4$), lithium titanium phosphate (e.g., $Li_xTi_y(PO_4)_3$, wherein $0<x<2$ and $0<y<3$), lithium aluminum titanium phosphate (e.g., $Li_xAl_yTi_z(PO_4)_3$, wherein $0<x<2$, $0<y<1$, and $0<z<3$), $Li_{1+x+y}(Al_aGa_{1-a})_x(Ti_bGe_{1-b})_{2-x}Si_yP_{3-y}O_{12}$ (wherein $0\leq x\leq 1$, $0\leq y\leq 1$, $0\leq a\leq 1$, and $0\leq b\leq 1$), lithium lanthanum titanate (e.g., $Li_xLa_yTiO_3$, wherein $0<x<2$ and $0<y<3$), lithium germanium thiophosphate (e.g., $Li_xGe_yP_zS_w$, wherein $0<x<4$, $0<y<1$, $0<z<1$, and $0<w<5$), lithium nitride (e.g., $Li_xN_y$, wherein $0<x<4$ and $0<y<2$), a $SiS_2$ glass (e.g., $Li_xSi_yS_z$, wherein $0<x<3$, $0<y<2$, and $0<z<4$), a $P_2S_5$ glass (e.g., $Li_xP_yS_z$, wherein $0<x<3$, $0<y<3$, and $0<z<7$), $Li_2O$, LiF, LiOH, $Li_2CO_3$, $LiAlO_2$, a $Li_2O$—$Al_2O_3$—$SiO_2$—$P_2O_5$—$TiO_2$—$GeO_2$ ceramic, a garnet ceramic (e.g., $Li_{3+x}La_3M_2O_{12}$, wherein $0\leq x\leq 5$, and M is Te, Nb, or Zr); a cross-linked structure of the first particle A having a cross-linkable functional group, or a combination thereof.

The cross-linkable functional group may be any suitable cross-linkable functional group, for example, an acrylate group, a methacrylate group, an epoxy group, or the like.

When the particle in the protective layer has a cross-linkable functional group on a surface thereof, the particle may be covalently linked so that the protective layer may have improved mechanical strength.

The ionic liquid which may be added to the protective layer-forming composition refers to a salt in a liquid state at room temperature or a fused salt at room temperature that consists of only ions having a melting point equal to or below room temperature. The ionic liquid may include a compound including a cation and an anion, for example: i) a cation including an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, or a combination thereof, and ii) an anion including $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $BF_4^-$, $SO_4^-$, $CF_3SO_3^-$, $(FSO_2)_2N^-$, $(C_2F_5SO_2)_2N^-$, $(C_2F_5SO_2)(CF_3SO_2)N^-$, and $(CF_3SO_2)_2N^-$, or a combination thereof.

In some embodiments, the ionic liquid may include N-methyl-N-propylpyrrolidinium bis(trifluoromethylsulfonyl)imide, N-butyl-N-methyl-pyrrolidinium bis(trifluoromethylsulfonyl)imide, 1-butyl-3-methyl-imidazolium bis(trifluoromethylsulfonyl)imide, 1-ethyl-3-methyl-imidazolium bis(trifluoromethylsulfonyl)imide, or a combination thereof.

The amount of the ionic liquid may be from about 5 parts by weight to about 40 parts by weight, or from about 7.5 parts by weight to about 30 parts by weight, and in some embodiments, about 10 parts by weight to about 20 parts by weight, based on 100 parts by weight of the particle in the protective layer. When the amount of the ionic liquid is within any of these ranges, the protective layer may have improved ion conductivity and improved mechanical properties.

When the protective layer includes an ionic liquid (IL) and a lithium salt, the mole ratio (IL/Li) of the ionic liquid to lithium ions may be about 0.1 to 2, and in some embodiments, about 0.2 to 1.8, and in some other embodiments, about 0.4 to 1.5. When the mole ratio of the ionic liquid to lithium ions is within any of these ranges, the protective layer may have high lithium ion mobility, high ion conductivity, and improved mechanical properties to effectively suppress growth of lithium dendrite on a surface of the anode.

The polymeric ionic liquid which may be added to the protective layer-forming composition may be, for example, a polymerization product of ionic liquid monomers, or a polymeric compound. The polymeric ionic liquid is highly soluble in an organic solvent, and thus may further improve the ion conductivity of polymer layer when further added to the protective layer-forming composition.

When the polymeric ionic liquid is prepared by polymerization of ionic liquid monomers as described above, a resulting product from the polymerization reaction may be washed and dried, followed by anionic substitution reaction to have appropriate anions that may improve solubility in an organic solvent In some embodiments, the polymeric ionic liquid may include a repeating unit that includes: i) a cation including an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, or a combination thereof, and ii) an anion including $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^{2-}$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, $(O(CF_3)_2C_2(CF_3)_2O)_2PO^-$, or a combination thereof.

In some embodiments, the polymeric ionic liquid may be prepared by polymerization of ionic liquid monomers. For example, the ionic liquid monomers may have a polymerizable functional group such as a vinyl group, an allyl group, an acrylate group, or a methacrylate group, and may include a cation including an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, a triazolium cation, or a combination thereof, and at least one of the above-listed anions.

Non-limiting examples of the ionic liquid monomers include 1-vinyl-3-ethylimidazolium bromide, a compound represented by Formula 7, or a compound represented by Formula 8.

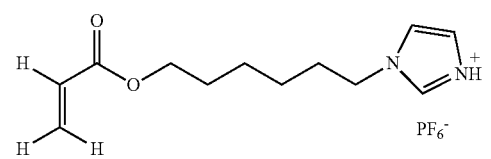

Formula 7

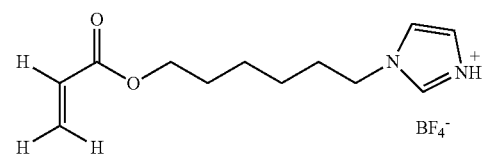

Formula 8

For example, the polymer ionic liquid may be a compound represented by Formula 9 or a compound represented by Formula 10.

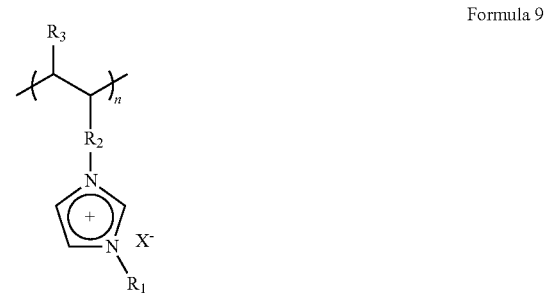

Formula 9

In Formula 9, $R_1$ and $R_3$ may be each independently a hydrogen, a substituted or unsubstituted C1-C30 alkyl group, a substituted or unsubstituted C2-C30 alkenyl group, a substituted or unsubstituted C2-C30 alkynyl group, a substituted or unsubstituted C6-C30 aryl group, a substituted or unsubstituted C2-C30 heteroaryl group, or a substituted or unsubstituted C4-C30 carbocyclic group;

$R_2$ may be a chemical bond, a C1-C3 alkylene group, a C6-C30 arylene group, a C2-C30 heteroarylene group, or a C4-C30 divalent carbocyclic group;

$X^-$ indicates an anion of the ionic liquid; and n may be from about 500 to 2,800.

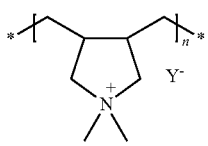

Formula 10

In Formula 10, $Y^-$ is an anion of the ionic liquid; and n may be from 500 to 2800.

For example, in Formula 10, $Y^-$ may be bis(trifluoromethylsulfonyl)imide (TFSI), bis(fluoromethylsulfonyl)imide, $BF_4^-$, or $CF_3SO_3^-$.

The polymeric ionic liquid may include, for example, a cation including poly(1-vinyl-3-alkylimidazolium), poly(1-allyl-3-alkylimidazolium), poly(1-(methacryloyloxy-3-alkylimidazolium), and an anion selected from $CH_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3CF_2SO_2)_2N^-$, $C_4F_9SO_3^-$, $C_3F_7COO^-$, $(CF_3SO_2)(CF_3CO)N^-$, or a combination thereof.

For example, the compound of Formula 10 may be polydiallyldimethyl ammonium bis(trifluoromethylsulfonyl)imide.

In some embodiments, the polymer ionic liquid may include a low-molecular weight polymer, a thermally stable ionic liquid, and a lithium salt. The low-molecular weight polymer may have an ethylene oxide chain. The low-molecular weight polymer may be a glyme. Non-limiting examples of the glyme are polyethyleneglycol dimethylether (polyglyme), tetraethyleneglycol dimethyl ether (tetraglyme), and triethyleneglycol dimethylether (triglyme).

The low-molecular weight polymer may have a weight average molecular weight of about 75 Daltons to about 2,000 Daltons, or about 100 Daltons to about 1000 Daltons, or for example, a weight average molecular weight of about 250 Daltons to about 500 Daltons. The lithium salt may be any of the compounds described above including lithium as alkaline metal.

The protective layer may further include an oligomer. For example, the oligomer in the protective layer may include polyethylene glycol dimethyl ether, polyethylene glycol diethyl ether, or a combination thereof. The oligomer may have a weight average molecular weight of about 200 Da to about 2,000 Da, or about 300 Da to about 1800 Da, or about 400 Da to about 1500 Da. The amount of the oligomer may be about 5 parts by weight to about 50 parts by weight, or about 10 parts by weight to about 40 parts by weight, or about 10 parts by weight to about 30 parts by weight, based on 100 parts by weight of the particles in the protective layer. When such an oligomer is added, the protective layer may have further improved film formability, mechanical properties, and ion conductivity characteristics.

The protective layer may have an ion conductivity as measured at about 25° C. of about $1 \times 10^{-4}$ Siemens per centimeter (S/cm) or greater, and in some embodiments, about $5 \times 10^{-4}$ S/cm or greater, and in some other embodiments, about $1 \times 10^{-3}$ S/cm or greater.

The protective layer of the anode according to any of the above-described embodiments may be applicable to a lithium metal battery, for example, a lithium air battery, a lithium ion battery, a lithium polymer battery, a lithium sulfur battery, or the like.

In some embodiments, the protective layer may be suitable as a protective layer for a high-voltage lithium secondary battery. The term "high-voltage" refers to a charging voltage of about 4 V to 5.5 V.

According to another embodiment of the present disclosure, there is provided a lithium metal battery including a cathode, the anode according to any of the above-described embodiments, and an electrolyte between the cathode and the anode.

The electrolyte may include a liquid electrolyte, a solid electrolyte, a gel electrolyte, a polymer ionic liquid, or a combination thereof. For example, the electrolyte may be a mixed electrolyte including at least one of these electrolytes. The lithium metal battery may further include a separator.

The electrolyte including a liquid electrolyte, a polymeric ionic liquid, a gel electrolyte, a solid electrolyte, or a combination thereof, may be between the cathode and the electrolyte. The gel electrolyte may be any gel electrolyte suitable for lithium batteries. For example, the gel electrolyte may include a polymer and a polymer ionic liquid. For example, the polymer may be a solid graft (block) copolymer electrolyte.

The solid electrolyte may be, for example, an organic solid electrolyte or an inorganic solid electrolyte. Non-limiting examples of the organic solid electrolyte are polyethylene derivatives, polyethylene oxide derivatives, polypropylene oxide derivatives, phosphoric acid ester polymer, polyester sulfide, polyvinyl alcohol, polyfluoride vinylidene, and polymers including ionic dissociative groups. A combination comprising at least one of the foregoing may also be used.

Non-limiting examples of the inorganic solid electrolyte are $Li_3N$, $LiI$, $Li_5NI_2$, $Li_3N-LiI-LiOH$, $Li_2SiS_3$, $Li_4SiO_4$, $Li_4SiO_4-LiI-LiOH$, $Li_3PO_4-Li_2S-SiS_2$, $Cu_3N$, LiPON, $Li_2S.GeS_2.Ga_2S_3$, $Li_2O.11Al_2O_3$, $(Na_a Li_{1-a})_{1+x}Ti_{2-x}Al_x(PO_4)_3$ (wherein $0.1 \le x \le 0.9$ and $0 \le a \le 1$), $Li_{1+x}Hf_{2-x}Al_x(PO_4)_3$ (wherein $0.1 \le x \le 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, a sodium silicate, $Li_{0.3}La_{0.5}TiO_3$, $Na_5MSi_4O_{12}$ (wherein M is a rare earth element, for example, Nd, Gd, Dy, or the like) $Li_5ZrP_3O_{12}$, $Li_5TiP_3O_{12}$, $Li_3Fe_2P_3O_{12}$, $Li_4NbP_3O_{12}$, $Li_{1+x}(M_aAl_bGa_{(1-a-b)})_x(Ge_{1-y}Ti_y)_{2-x}(PO_4)_3$ (wherein $X \le 0.8$, $0 \le Y \le 1.0$, $0 \le a \le 1$, $0 \le b \le 1$ and M is Nd, Sm, Eu, Gd, Tb, Dy, Ho, Er, Tm, or Yb), $Li_{1+x+y}Q_xTi_{2-x}Si_yP_{3-y}O_{12}$ (wherein $0<x \le 0.4$, $0<y \le 0.6$, and Q is Al or Ga), $Li_6BaLa_2Ta_2O_{12}$, $Li_7La_3Zr_2O_{12}$, $Li_5La_3Nb_2O_{12}$, $Li_5La_3M_2O_{12}$ (wherein M is Nb or Ta), and $Li_{7+x}A_xLa_{3-x}Zr_2O_{12}$ (wherein $0<x<3$ and A is Zn). A combination comprising at least one of the foregoing may also be used.

In some embodiments, the protective layer of the anode in the lithium metal battery may include a metal salt containing a Group 1 or Group 2 element, a nitrogen-containing additive, boron nitride or a combination thereof.

The metal salt containing a Group 1 or Group 2 element may include Cs, Rb, K, Ba, Sr, Ca, Na, Mg, or a combination thereof. The nitrogen-containing additive may include an inorganic nitrate, an organic nitrate, an inorganic nitrite, an organic nitrite, an organic nitro compound, an organic nitroso compound, an N—O compound, a lithium nitride ($Li_3N$), or a combination thereof.

The metal salt containing a Group 1 or Group 2 element, and the nitrogen-containing additive may be insoluble in an organic solvent of a liquid electrolyte of the electrolyte. Due to the insoluble characteristics, the metal salt containing a Group 1 or Group 2 element, and the nitrogen-containing additive in the protective layer may be stably confined to a surface region of the lithium metal electrode with limited mobility, so that migration of lithium ions between electrodes may not be hindered when using the protective layer with the limited mobility of the metal salt containing a Group 1 or Group 2 element, and the nitrogen-containing additive therein.

The metal of the metal salt containing a Group 1 or Group 2 element has a relatively larger atomic size than lithium. Due to this steric hindrance, the metal salt containing a Group 1 or Group 2 element is able to have a steric hindrance effect in the protective layer, and thus can suppress growth of lithium dendrite on the surface of the lithium metal electrode. A metal cation (for example, cesium (Cs) or rubidium (Rb) ions) in the metal salt containing a Group 1 or Group 2 element may exhibit an effective reduction potential below the reduction potential of lithium ions and thus may form a positively charged electrostatic shield around the initial growth tip of protuberances on the surface of the lithium metal electrode without reduction or deposition of the metal salt during lithium deposition. The positively charged electrostatic shield may effectively suppress growth of lithium dendrite on the surface of the lithium metal electrode. In order for the metal salt containing a Group 1 or Group 2 element to have an effective reduction potential below the reduction potential of lithium ions as described above, the amount of the metal salt containing a Group 1 or Group 2 may be selected to be within a range of about 0.1 part by weight to about 100 parts by weight, or about 1 part by weight to about 75 parts by weight, or about 10 parts by weight to about 50 parts by weight, based on 100 parts by weight of the particles in the protective layer.

The protective layer of the anode in the lithium metal battery may have improved mechanical strength and flexibility sufficient to suppress the formation of lithium dendrites. The lithium metal battery may further include an ion-conductive thin film between the lithium metal electrode and the protective layer. The ion-conductive thin film may improve the ion conductivity of the protective layer and lithium ion mobility (or lithium ion transference number), and thus reduce an interfacial resistance between the lithium metal electrode and the protective layer. For example, the ion-conductive thin film may include lithium nitride ($Li_3N$).

The protective layer of the anode in the lithium metal battery may also chemically improve a deposition/dissolution process of lithium ions to thus may improve deposition morphology of the lithium metal electrode compared to when forming another protective layer, and consequentially increase deposition density on the surface of the lithium metal electrode and lithium ion mobility (or transference number). In addition, as described above, the metal salt containing a Group 1 element or Group 2 element, and a nitrogen-containing additive is confined to the protective layer on the surface of the lithium metal electrode, and thus is unlikely to be dispersed in the liquid electrolyte or to migrate toward the cathode and react with the cathode. As a result, the lithium metal battery including the protective layer may have improved rate capability and lifetime characteristics.

For example, the nitrogen-containing additive in the protective layer may include an inorganic nitrate, an organic nitrate, an inorganic nitrite, an organic nitrite, an organic nitro compound, an organic nitroso compound, an N—O compound, lithium nitride ($Li_3N$), or a combination thereof. However, embodiments are not limited thereto.

For example, the inorganic nitrate may include lithium nitrate, potassium nitrate, cesium nitrate, barium nitrate, ammonium nitrate, or a combination thereof. For example, the organic nitrate may include dialkyl imidazolium nitrate, guanidine nitrate, ethyl nitrate, propyl nitrate, butyl nitrate, pentyl nitrate, octyl nitrate, or a combination thereof. For example, the organic nitrite may include ethyl nitrite, propyl nitrite, butyl nitrite, pentyl nitrite, octyl nitrite, or a combination thereof.

For example, the organic nitroso compound may include nitromethane, nitropropane, nitrobutane, nitrobenzene, dinitrobenzene, nitrotoluene, dinitrotoluene, nitropyridine, or a combination thereof. For example, the N—O compound may include pyridine N-oxide, a (C1-C9 alkyl)pyridine N-oxide, tetramethyl piperidine N-oxyl (TEMPO), or a combination thereof.

In some embodiments, the nitrogen-containing additive in the protective layer include $LiNO_3$, $Li_3N$, or a combination thereof, and the Group 1 element- or Group 2 element-containing metal salt in the protective layer may be cesium bis(trifluoromethylsulfonyl)imide (CsTFSI), $CsNO_3$, $CsPF_6$, CsFSI, $CsAsF_6$, $CsClO_4$, or $CsBF_4$. For example, the metal salt containing a Group 1 or Group 2 element may be CsTFSI.

The amount of the metal salt containing a Group 1 or Group 2 element and a nitrogen-containing additive in the protective layer may be from about 0.1 part by weight to about 100 parts by weight, or about 0.1 part by weight to about 50 parts by weight, and in some embodiments, about 0.1 part by weight to about 30 parts by weight, based on 100 parts by weight of the particles in the protective layer. When the amount of the metal salt containing a Group 1 or Group 2 element and a nitrogen-containing additive is within any of these ranges, the lithium metal battery may have a lithium dendritic growth suppression effect, a reduced interfacial resistance between the surface of the lithium metal electrode and the protective layer, and improved lithium ion mobility.

In some embodiments, the protective layer may include only a metal salt containing a Group 1 or Group 2 element. In this regard, the amount of the metal salt containing a Group 1 or Group 2 element may be about 0.1 part by weight to about 100 parts, and in some embodiments, about 0.1 part by weight to about 30 parts by weight, based on 100 parts by weight of the particles in the protective layer.

In some embodiments, the protective layer may include only a nitrogen-containing additive. In this regard, the amount of the nitrogen-containing additive may be about 0.1 part by weight to about 100 parts by weight, and in some embodiments, about 0.1 part by weight to about 30 parts by weight, based on 100 parts by weight of the particles in the protective layer.

In some other embodiments, the protective layer may include both a metal salt containing a Group 1 element or a Group 2 element, and a nitrogen-containing additive. In this regard, the amount of the metal salt containing a Group 1 or Group 2 element may be about 0.01 part by weight to about 99.99 parts by weight, and in some embodiments, about 0.1 part by weight to about 30 parts by weight, based on 100 parts by weight of the particles in the protective layer. The amount of the nitrogen-containing additive may be about 0.01 part by weight to about 99.99 parts by weight, and in some embodiments, about 0.1 part by weight to about 30 parts by weight, based on 100 parts by weight of the particles in the protective layer.

In some embodiments, a mixed weight ratio of the metal salt containing a Group 1 or Group 2 element to the nitrogen-containing additive in the protective layer may be about 1:9 to about 9:1, and in some other embodiments, about 1:2 to about 2:1, and in some other embodiments, about 1:1. When the weight ratio of the metal salt containing a Group 1 or Group 2 element to the nitrogen-containing additive is within any of these ranges, due to good deposition density on the surface of the lithium metal electrode and improved lithium ion mobility characteristics in the electrolyte, the lithium metal battery may have improved rate capability and lifetime characteristics.

The lithium metal electrode of the anode in the lithium metal battery may be a lithium metal electrode a lithium metal alloy electrode. The lithium metal battery may further include a liquid electrolyte between the electrolyte and the cathode, the liquid electrolyte including an organic solvent, an ionic liquid, and a lithium salt, or a combination thereof.

A lithium metal battery with improved capacity retention may be manufactured using an anode according to any of the above-described embodiments. The lithium metal battery according to any of the above-described embodiments may have improved voltage characteristics, improved capacity, improved specific energy, and improved energy density, and thus is suitable for wide use in mobile phones, laptop computers, storage batteries for power generating units using wind power or sunlight, electric vehicles, uninterruptable power supplies (UPS), household storage batteries, and the like.

FIGS. 13A to 13D are schematic views illustrating structures of lithium metal batteries according to embodiments.

Figure 13A:
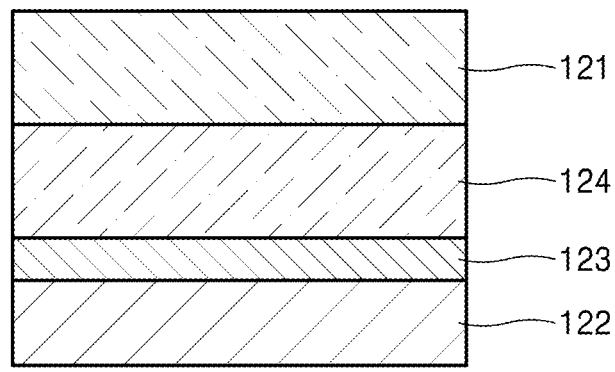
FIGS. 13A to 13D are schematic cross-sectional views illustrating a structure of lithium metal batteries according to embodiments.

Referring to FIG. 13A, a lithium metal battery according to an embodiment may have a structure including a cathode 121, an anode 122 according to any of the above-described embodiments, and an electrolyte 124 between the cathode 121 and the anode 122. A protective layer 123 may be between the electrolyte 124 and the anode 122. The electrolyte 124 may include a liquid electrolyte, a polymeric ionic liquid, a solid electrolyte, a gel electrolyte, or a combination thereof. The lithium metal battery may further include a separator.

The protective layer 123 may be on at least a portion of the anode 122, so that the surface of the anode 122 may be mechanically and electrochemically stable. As a result, during charge and discharge of the lithium metal battery, dendritic formation on the surface of the anode 122 may be suppressed, and interfacial stability between the anode 122 and the electrolyte 124 may be improved. Thus, the lithium metal battery may have improved cycle characteristics.

Figure 13B:
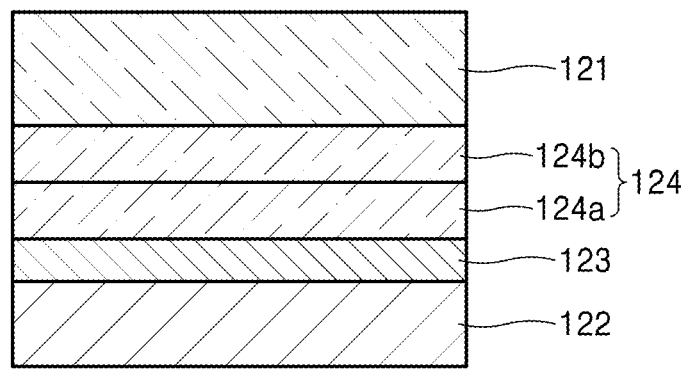

The electrolyte 124 may have a two-layer stack structure including a liquid electrolyte 124a and a solid electrolyte 124b that may be sequentially stacked, as illustrated in FIG. 13B. The liquid electrolyte 124a may be adjacent to the protective layer 123. The lithium metal battery may have a stack structure of anode/protective layer/electrolyte(liquid electrolyte/solid electrolyte)/cathode in the stated order.

Figure 13C:
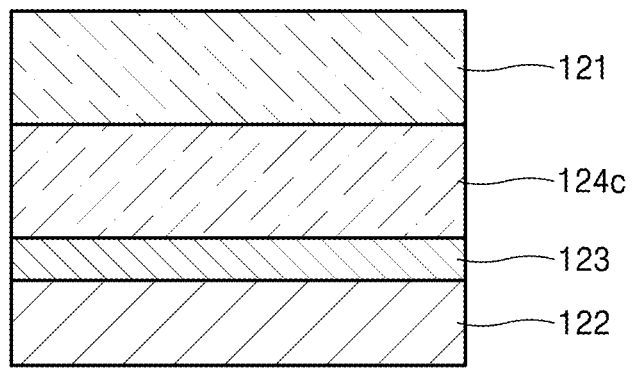

Referring to FIG. 13C, a lithium metal battery according to another embodiment may further include a separator 124c. For example, the separator may be a monolayer or a multilayer including at least two layers of polyethylene, polypropylene, polyvinylidene fluoride, or a combination thereof. For example, the separator may be a mixed multilayer, such as a two-layer separator of polyethylene/polypropylene, a three-layer separator of polyethylene/polypropylene/polyethylene, or a three-layer separator of polypropylene/polyethylene/polypropylene. The separator may include an electrolyte including a lithium salt and an organic solvent.

Figure 13D:
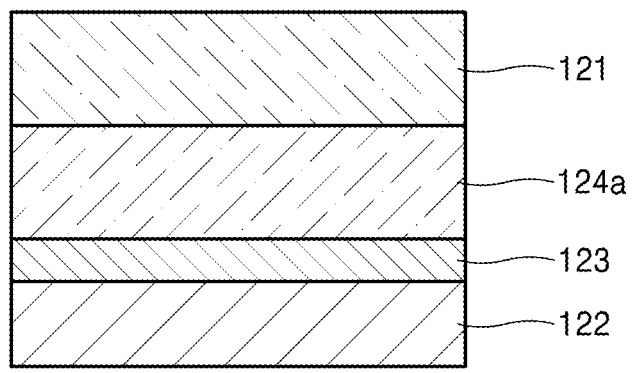

Referring to FIG. 13D, a lithium metal battery according to another embodiment may include a liquid electrolyte 124a. The liquid electrolyte 124a may have a composition that may be the same or different from the composition of a liquid electrolyte that may be included in the protective layer 123.

Figure 14:
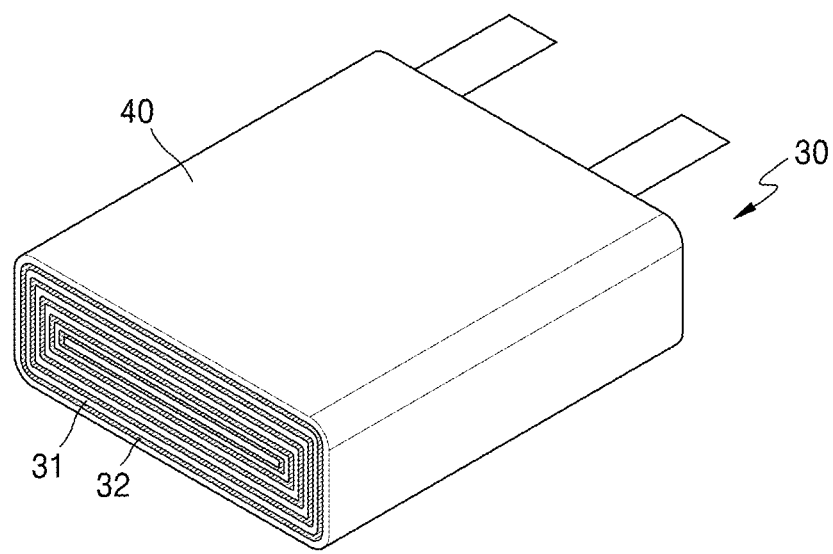
FIG. 14 is a schematic view illustrating a structure of a lithium metal battery 30 according to another embodiment.

FIG. 14 is a schematic view illustrating a structure of a lithium metal battery 30 according to another embodiment.

The lithium metal battery 30 may include a cathode 31, an anode 32 according to any of the above-described embodiments, and a battery case 40 accommodating the cathode 31 and the anode 32.

The cathode 31 may be a porous cathode. The porous cathode may be a cathode including pores, or any cathode that allows permeation of liquid electrolyte thereinto by capillary action.

For example, the porous cathode may be a cathode that may be obtained by coating a cathode active material composition including a cathode active material, a conducting agent, a binder, and a solvent, and drying the resulting structure. The resulting cathode may include pores between the particles of the cathode active material. The porous cathode may be impregnated with liquid electrolyte.

In some embodiments, the cathode may include a liquid electrolyte, a gel electrolyte, or a solid electrolyte. The liquid electrolyte, the gel electrolyte, and the solid electrolyte may be any electrolyte suitable for a lithium metal battery that does not react with the cathode active material, and thus prevents deterioration of the cathode active material during charge and discharge.

Each element of a lithium metal battery including an anode according to any of the embodiments, and a method of manufacturing the lithium metal battery will now be described in further detail.

A cathode active material for the cathode may include lithium cobalt oxide, lithium nickel cobalt manganese oxide, lithium nickel cobalt aluminum oxide, lithium iron phosphate, lithium manganese oxide, or a combination thereof, but is not limited thereto. Any suitable cathode active material may be used.

For example, the cathode active material may include a compound represented by one of the following formulae: $Li_aA_{1-b}B'_bD_2$ (wherein $0.90 \le a \le 1.8$, and $0 \le b \le 0.5$); $Li_aE_{1-b}B'_bO_{2-c}D_c$ (wherein $0.90 \le a \le 1.8$, $0 \le b \le 0.5$, and $0 \le c \le 0.05$); $LiE_{2-b}B'_bO_{4-c}D_c$ (wherein $0 \le b \le 0.5$, and $0 \le c \le 0.05$); $Li_aN_{1-b-c}Co_bB'_cD_\alpha$ (wherein $0.90 \le a \le 1.8$, $0 \le b \le 0.5$, $0 \le c \le 0.05$, and $0 < \alpha < 2$); $Li_aNi_{1-b-c}Co_bB'_cO_{2-\alpha}F'_\alpha$ (wherein $0.90 \le a \le 1.8$, $0 \le b \le 0.5$, $0 \le c \le 0.05$, and $0 < \alpha < 2$); $Li_aNi_{1-b-c}Mn_bB'_cD_\alpha$ (wherein $0.90 \le a \le 1.8$, $0 \le b \le 0.5$, $0 \le \alpha \le 0.05$, and $0 < a \le 2$); $Li_aNi_{1-b-c}Mn_bB'_cO_{2-\alpha}F'_\alpha$ (wherein $0.90 \le a \le 1.8$, $0 \le b \le 0.5$, $0 \le c \le 0.05$, and $0 < \alpha < 2$); $Li_aNi_bE_cG_dO_2$ (wherein $0.90 \le a \le 1.8$, $0 \le b \le 0.9$, $0 \le c \le 0.5$, and $0.001 \le d \le 0.1$); $Li_aNi_bCo_cMn_dGeO_2$ (wherein $0.90 \le a \le 1.8$, $0 \le b \le 0.9$, $0 \le c \le 0.5$, $0 \le d \le 0.5$, and $0.001 \le d \le 0.1$); $Li_aNi_bG_bO_2$ (wherein $0.90 \le a \le 1.8$, and $0.001 \le b \le 0.1$); $Li_aCoG_bO_2$ (wherein $0.90 \le a \le 1.8$, and $0.001 \le b \le 0.1$); $Li_aMnG_bO_2$ (wherein $0.90 \le a \le 1.8$, and $0.001 \le b \le 0.1$); $Li_aMn_2G_bO_4$ (wherein $0.90 \le a \le 1.8$, and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \le f \le 2$); $Li_{(3-f)}Fe_2(PO_4)_3$ (wherein $0 \le f \le 2$); and $LiFePO_4$. A combination comprising at least one of the foregoing may also be used.

In the formulae above, A is nickel (Ni), cobalt (Co), manganese (Mn), or a combination thereof; B' is aluminum (Al), nickel (Ni), cobalt (Co), manganese (Mn), chromium (Cr), iron (Fe), magnesium (Mg), strontium (Sr), vanadium (V), a rare earth element, or a combination thereof; D is oxygen (O), fluorine (F), sulfur (S), phosphorus (P), or a combination thereof; E is cobalt (Co), manganese (Mn), or a combination thereof; F' is fluorine (F), sulfur (S), phosphorus (P), or a combination thereof; G is aluminum (Al), chromium (Cr), manganese (Mn), iron (Fe), magnesium (Mg), lanthanum (La), cerium (Ce), strontium (Sr), vanadium (V), or a combination thereof; Q is titanium (Ti), molybdenum (Mo), manganese (Mn), or a combination thereof; I' is chromium (Cr), vanadium (V), iron (Fe), scandium (Sc), yttrium (Y), or a combination thereof; and J is vanadium (V), chromium (Cr), manganese (Mn), cobalt (Co), nickel (Ni), copper (Cu), or a combination thereof. For example, the cathode active material may be one of the compounds represented by Formulae 11 to 14.

$$Li_aNi_bCo_cMn_dO_2 \quad \text{Formula 11}$$

In Formula 11, $0.90 \leq a \leq 1.8$, $0 \leq b \leq 0.9$, $0 \leq c \leq 0.5$, and $0 \leq d \leq 0.5$.

$$Li_2MnO_3 \quad \text{Formula 12}$$

$$LiMO_2 \quad \text{Formula 13}$$

In Formula 13, M may be Mn, Fe, Co, or Ni.

$$Li_aNi_bCO_cAl_dO_2 \quad \text{Formula 14}$$

In Formula 14, $0.90 \leq a \leq 1.8$, $0 \leq b \leq 0.9$, $0 \leq c \leq 0.5$, and $0 \leq d \leq 0.5$.

The cathode of the lithium metal battery may be manufactured as follows.

A cathode active material, a binder, and a solvent are mixed to prepare a cathode active material composition. A conducting agent may be further added into the cathode active material composition. The cathode active material composition is directly coated on a metallic current collector and dried to prepare a cathode plate. Alternatively, the cathode active material composition may be cast on a separate support to form a cathode active material film, which may then be separated from the support and then laminated on a metallic current collector to prepare a cathode plate.

The binder is a composition that contributes binding with an active material and a conductive material and binding with a current collector, and thus an amount of the binder added may be from about 1 part by weight to about 50 parts by weight, based on 100 parts by weight based of the cathode active material. Non-limiting examples of the binder include polyvinylidene fluoride (PVDF), polyvinyl alcohol, carboxymethylcellulose (CMC), starch, hydroxypropylcellulose, reproduced cellulose, polyvinylpyrrolidone, tetrafluoroethylene, polyethylene, polypropylene, ethylene-propylene-diene terpolymer (EPDM), sulfonated EPDM, styrene butadiene rubber, fluorine rubber, and various copolymers. The amount of the binder may be from about 1 part by weight to about 50 parts by weight based on 100 parts by weight, or from about 2 parts by weight to about 5 parts by weight, based on 100 parts by weight of the cathode active material. When the content of the binder is within this range, a binding force of the cathode active material layer to the current collector may be satisfactory.

The conducting agent may be any suitable material that does not cause a chemical change in the lithium metal battery and which has electrical conductivity. Non-limiting examples of the conducting agent include graphite such as natural graphite or artificial graphite; carbonaceous materials, such as carbon black, acetylene black, Ketjen black, channel black, furnace black, or lamp black; conductive fibers, such as carbon fibers or metal fibers; carbon fluoride; metal powder, such as aluminum or nickel powder; conductive whiskers, such as zinc oxide or potassium titanate; a conductive metal oxide, such as a titanium oxide; and a conductive material, such as a polyphenylene derivative. A combination comprising at least one of the foregoing may also be used.

The amount of the conducting agent may be from about 1 part by weight to about 10 parts by weight, for example, from about 2 parts to about 5 parts by weight based on 100 parts by weight, based on a total weight of the cathode active material. When the amount of the conducting agent is within any of these ranges, the final cathode may have good conductivity characteristics.

A non-limiting example of the solvent is N-methylpyrrolidone.

The amount of the solvent may be from about 100 parts by weight to about 2,000 parts by weight, based on 100 parts by weight of the cathode active material. When the amount of the solvent is within this range, a process for forming the cathode active material layer may be easily carried out.

The amounts of the cathode active material, the conducting agent, the binder, and the solvent may be determined by a person of skill in the art without undue experimentation. At least one of the conducting agent, the binder, and the solvent may be omitted depending on the use and structure of a lithium metal battery.

The anode may be, for example, a lithium metal thin film or a lithium metal alloy thin film, as described above.

A lithium metal alloy for the anode may include lithium, and a metal/metalloid alloyable with lithium. Examples of the metal/metalloid alloyable with lithium are Si, Sn, Al, Ge, Pb, Bi, Sb, a Si—Y' alloy (wherein Y' is an alkaline metal, an alkaline earth metal, a Group 13 to Group 16 element, a transition metal, a rare earth element, or a combination thereof, except for Si), a Sn—Y' alloy (wherein Y' is an alkaline metal, an alkaline earth metal, a Group 13 to Group 16 element, a transition metal, a rare earth element, or a combination therefor, except for Sn). Y' may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

The electrolyte may include a separator and/or a lithium salt-containing nonaqueous electrolyte which are suitable for use for lithium metal batteries in the art.

The separator may be an insulating thin film having high ion permeability and high mechanical strength. The separator may have a pore diameter of about 0.01 μm to about 10 μm, and a thickness of about 5 μm to about 20 μm. Non-limiting examples of the separator are olefin-based polymers, such as polypropylene, and sheets or non-woven fabric made of glass fiber or polyethylene. When a lithium metal battery includes a solid polymer electrolyte, the solid polymer electrolyte may also serve as the separator.

For example, the separator may be a monolayer or a multilayer including at least two layers of polyethylene, polypropylene, polyvinylidene fluoride, or a combination thereof. For example, the separator may be a mixed multilayer, such as a two-layer separator of polyethylene/polypropylene, a three-layer separator of polyethylene/polypropylene/polyethylene, or a three-layer separator of polypropylene/polyethylene/polypropylene. The separator may include an electrolyte including a lithium salt and an organic solvent.

The lithium salt-containing nonaqueous electrolyte may include a nonaqueous electrolyte and a lithium salt. The nonaqueous electrolyte may be a nonaqueous liquid electrolyte, an organic solid electrolyte, or an inorganic solid electrolyte.

The nonaqueous liquid electrolyte may include an organic solvent. The organic solvent may be any suitable organic solvent. For example, the organic solvent may be propylene carbonate, ethylene carbonate, fluoroethylene carbonate, butylene carbonate, dimethyl carbonate, diethyl carbonate, methyl ethyl carbonate, methylpropyl carbonate, ethylpropyl carbonate, methylisopropyl carbonate, dipropyl carbonate, dibutyl carbonate, chloroethylene carbonate, benzonitrile, acetonitrile, tetrahydrofuran, 2-methyltetrahydrofuran, γ-butyrolactone, 1,3-dioxolane, 4-methyldioxolane, N,N-dimethyl formamide, N,N-dimethyl acetamide, dimethylsulfoxide, dioxane, 1,2-dimethoxyethane, sulfolane, dichloroethane, chlorobenzene, nitrobenzene, diethylene glycol, dimethyl ether, or a combination thereof.

For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO2)(C_yF_{2y+1}SO_2)$ (wherein x and y are natural numbers), LiCl, LiI, or a combination thereof. For example, to improve charge-discharge characteristics and resistance to flame in a lithium metal battery, pyridine, triethylphosphate, triethanolamine, cyclic ether, ethylene diamine, n-glyme, hexamethyl phosphoramide, nitrobenzene derivative, sulfur, a quinone imine dye, N-substituted oxazolidinone, N, N-substituted imidazolidine, ethylene glycol dialkyl ether, an ammonium salt, pyrrole, 2-methoxyethanol, or aluminum trichloride, or a combination thereof, may be added to the nonaqueous electrolyte. In some embodiments, to provide nonflammable characteristics, a halogen-containing solvent such as carbon tetrachloride, ethylene trifluoride, or the like may be further added to the nonaqueous electrolyte.

For example, the lithium metal battery according to any one of the above-described embodiments may have improved capacity and improved lifetime characteristics, and thus may be used in a battery cell for use as a power source of a small device. The lithium metal battery may also be used as a unit battery of a medium-large size battery pack or battery module that include a plurality of battery cells for use as a power source of a medium-large size device.

Examples of the medium-large size device are electric vehicles (EVs), including hybrid electric vehicles (HEVs) and plug-in hybrid electric vehicles (PHEVs); electric two-wheeled vehicles, including E-bikes and E-scooters; power tools; power storage devices; and the like, but are not limited thereto.

As used herein, the term "alkyl" refers to a completely saturated branched or unbranched (or straight-chained or linear) hydrocarbon group having the specified number of carbon atoms and having a valence of at least one. Non-limiting examples of the "alkyl" group include methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, and n-heptyl.

At least one hydrogen atom of the alkyl group may be substituted with a halogen atom, a C1-C20 alkyl group substituted with a halogen atom (for example, $CCF_3$, $CHCF_2$, $CH_2F$, $CCl_3$, and the like), a C1-C20 alkoxy group, a C2-C20 alkoxyalkyl group, a hydroxyl group, a nitro group, a cyano group, an amino group, an amidino group, a hydrazine, a hydrazone, a carboxyl group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C6-C20 arylalkyl group, a C6-C20 heteroaryl group, a C7-C20 heteroarylalkyl group, a C6-C20 heteroaryloxyl group, a C6-C20 heteroaryloxyalkyl group, or a C6-C20 heteroarylalkyl group.

The term "halogen atom" indicates fluorine, bromine, chlorine, iodine, and the like.

As used herein, the term "alkenyl" group indicates a branched or unbranched hydrocarbon that includes at least one carbon-carbon double bond and has a valence of at least one. Non-limiting examples of the alkenyl group are vinyl, allyl, butenyl, isopropenyl, and isobutenyl. At least one hydrogen atom in the alkenyl group may be substituted with any of the substituents for the alkyl group as described above as the long as the valence of the alkenyl group is not exceeded.

As used herein, the term "alkynyl" indicates a branched or unbranched hydrocarbon with at least one carbon-carbon triple bond. Non-limiting examples of the "alkynyl" group are ethynyl, butynyl, isobutynyl, and isopropynyl. At least one hydrogen atom of the "alkynyl" group may be substituted with any of the substituents for the alkyl group as described above.

The term "aryl" means a cyclic group in which all ring members are carbon and at least one ring is aromatic. More than one ring may be present and any additional rings may be independently aromatic, saturated, or partially unsaturated, and may be fused, pendant, spirocyclic or a combination thereof. Non-limiting examples of the "aryl" group are phenyl, naphthyl, and tetrahydronaphthyl. At least one hydrogen atom of the "aryl" group may be substituted with any of the substituents for the alkyl group as described above.

As used herein, the term "heteroaryl" group indicates a monocyclic or bicyclic organic group that includes one or more aromatic rings, in which at least one ring member is a heteroatom selected from among nitrogen (N), oxygen (O), phosphorous (P), and sulfur (S), wherein the rest of the cyclic atoms are all carbon. The heteroaryl group may include, for example, one to five heteroatoms, and in some embodiments, may include a five- to ten-membered ring. In the heteroaryl group, S or N may be present in various oxidized forms. Non-limiting examples of the heteroaryl group are thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl, oxazol-5-yl, isoxazol-3-yl, isoxazol-4-yl, isoxazol-5-yl, 1,2,4-triazol-3-yl, 1,2,4-triazol-5-yl, 1,2,3-triazol-4-yl, 1,2,3-triazole-5-yl, tetrazolyl, pyridine-2-yl, pyridine-3-yl, pyrazine-2-yl, pyrazine-4-yl, pyrazine-5-yl, pyrimidine-2-yl, pyrimidine-4-yl, or pyrimidin-5-yl.

The term "heteroaryl" includes a heteroaromatic ring that is selectively fused to at least one of an aryl group, a cycloaliphatic group, and a heterocyclic group.

As used herein, the term "carbocyclic" group indicates a saturated or partially unsaturated non-aromatic monocyclic, bicyclic, or tricyclic hydrocarbon group. Non-limiting examples of the monocyclic hydrocarbon group are cyclopentyl, cyclopentenyl, cyclohexyl, and cyclohexenyl. Non-limiting examples of the bicyclic hydrocarbon group are bornyl, decahydronaphthyl, bicyclo[2.1.1]hexyl, bicyclo [2.2.1]heptyl, bicyclo[2.2.1]heptenyl, or bicyclo[2.2.2]octyl. A non-limiting example of the tricyclic hydrocarbon is adamantly.

As used herein, the term "heterocyclic" group indicates a C5-20 cyclic hydrocarbon group, for example, C5-C10) cyclic hydrocarbon group, including at least one hetero atom. For example, the at least one hetero atom is selected from S, N, O, and B.

As used herein, the terms "alkoxy", "aryloxy", and "heteroaryloxy" indicate alkyl, aryl, and heteroaryl, respectively, each bound to oxygen atom.

One or more embodiments of the present disclosure will now be described in detail with reference to the following examples. However, these examples are only for illustrative purposes and are not intended to limit the scope of the one or more embodiments of the present disclosure.

In the following examples, Pyr13FSI as ionic liquid is the abbreviation for N-methyl-N-propylpyrrolidinium bis(fluorosulfonyl)imide as a compound represented by Formula 15.

Formula 15

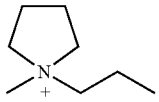

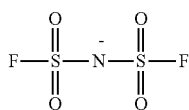

EXAMPLES

Example 1: Manufacture of Lithium Metal Battery

Poly(styrene-b-divinylbenzene) block copolymer microspheres having an average particle diameter of about 3 μm (EPR-PSD-3, available from EPRUI Nanoparticles & Microspheres Co., Ltd.) were added to anhydrous tetrahydrofuran to obtain a 5 wt % block copolymer-including mixture.

The block copolymer in the block copolymer-including mixture included a polystyrene block and a polydivinylbenzene block in a ratio of about 9:1 by weight, and the poly(styrene-b-divinylbenzene) block copolymer had a weight average molecular weight of about 100,000 Daltons.

Lithium bis(fluorosulfonyl)imide (LiFSI, LiN(SO$_2$F)$_2$) was added to the block copolymer-including mixture to obtain a protective layer-forming composition. The amount of LiFSI was about 30 parts by weight based on 100 parts by weight of the poly(styrene-b-divinylbenzene) copolymer.

The protective layer-forming composition was coated on a lithium metal thin film (having a thickness of about 20 μm) on a copper thin film to a thickness of about 3 μm with a doctor blade, dried at about 25° C., and then further dried in a vacuum at about 40° C. for about 24 hours.

Diethyleneglycol diacrylate (DEGDA) was dissolved in tetrahydrofuran to prepare a 30 wt % solution. The amount of DEGDA was about 30 parts by weight based on 100 parts by weight of the poly(styrene-b-divinylbenzene) block copolymer microspheres. The solution was cast on a resulting product from the drying and dried at about 25° C., followed by UV irradiation at about 40° C. for about 1 hour, to thereby form an anode with a protective layer including the microspheres on the lithium metal thin film and a crosslinked material of DEGDA in the gaps between the microspheres. The amount of the crosslinked material of DEGDA was about 20 parts by weight based on 100 parts by weight of the poly(styrene-b-divinylbenzene) block copolymer microspheres.

A solid electrolyte-forming composition was cast onto the protective layer on the anode and dried at about 40° C., thereby forming a solid electrolyte on the protective layer.

The solid electrolyte-forming composition was obtained as follows. Polyethylene oxide (PEO) and acetonitrile were mixed together to obtain a 5 wt % PEO-acetonitrile solution. To the PEO-acetonitrile solution a block copolymer-containing mixture and lithium bis(fluorosulfonyl)imide (LiFSI, LiN(SO$_2$F)$_2$) were added to obtain the solid electrolyte-forming composition.

The block copolymer-containing mixture was obtained by adding poly(styrene-b-divinylbenzene) block copolymer microspheres (having an average particle diameter of about 3 μm (available from EPR-PSD-3, EPRUI Nanoparticles & Microspheres Co., Ltd.) to anhydrous tetrahydrofuran. An amount of the block copolymer was about 5 wt %. A ratio of a polystyrene block and a polydivinylbenzene block in the block copolymer was about 9:1 by weight. The poly(styrene-b-divinylbenzene) block copolymer had a weight average molecular weight of about 100,000 Daltons.

An amount of the poly(styrene-b-divinylbenzene) block copolymer in the solid electrolyte-forming composition was about 15 parts by weight based on 100 parts by weight of the PEO, and an amount of the LiFSI was about 30 parts by weight based on 100 parts by weight of the PEO.

Li[Ni$_{0.898}$Co$_{0.087}$Al$_{0.015}$]O$_2$ (available from Ecopro Co.), a conducting agent (SUPER-P®, available from Timcal Ltd.), polyvinylidene fluoride (PVdF), and N-methylpyrrolidone were mixed to obtain a cathode active material layer-forming composition. A weight ratio of Li[Ni$_{0.898}$Co$_{0.087}$Al$_{0.015}$]$_2$ to the conducting agent, to the PVdF in the cathode active material layer-forming composition was about 90:5:5. The amount of N-methylpyrrolidone used was about 137 grams with respect to 97 grams of Li[Ni$_{0.988}$Co$_{0.087}$Al$_{0.0015}$]O$_2$.

The cathode active material layer-forming composition was coated on an aluminum foil (having a thickness of about 15 μm) and dried at about 25° C., then further under vacuum at about 110° C., thereby manufacturing a cathode.

The cathode and the anode (having a thickness of about 20 μm) manufactured according to the above-described processes were assembled with a composite electrolyte structure including the protective layer and the solid electrolyte between the cathode and the anode, thereby manufacturing a lithium metal battery.

Example 2: Manufacture of Lithium Metal Battery

A lithium metal battery was manufactured in the same manner as in Example 1, except that a ceramic conductor and a catholyte were included between the cathode and the solid electrolyte, and LiNi$_{0.6}$Co$_{0.2}$Mn$_{0.2}$O$_2$, instead of Li[Ni$_{0.898}$Co$_{0.087}$Al$_{0.015}$]O$_2$, was used to manufacture the cathode. The lithium metal battery had a structure in which the lithium anode, the solid electrolyte (first electrolyte), the second electrolyte, the catholyte, and the cathode were sequentially stacked upon one another in this stated order.

The second electrolyte used, including the ceramic conductor, was a ceramic solid electrolyte (Li$_{1.5}$Al$_{0.5}$Ti$_{1.5}$(PO$_4$)$_3$ (lithium titanium aluminum phosphate (LATP), having a thickness of about 200 μm, available from Ohara glass).

The catholyte was prepared by mixing a 1M LiFSI solution including a mixture of PYR13FSI (N-methyl-N-propyl pyrrolidinium bis(fluorosulfonyl) imide) and tetraglyme (G4) in a ratio of 4:1 by weight, a poly(styrene-b-ethyleneoxide-b-styrene) block copolymer, and tetrahydrofuran.

A ratio of a styrene block to an ethyleneoxide block to a styrene block in the poly(styrene-b-ethyleneoxide-b-styrene) block copolymer was about 10:37:10 by weight. An amount of the block copolymer was about 25 parts by weight based on 100 parts by weight of the 1M LiFSI solution.

Example 3: Manufacture of Lithium Metal Battery

Figure 7A:
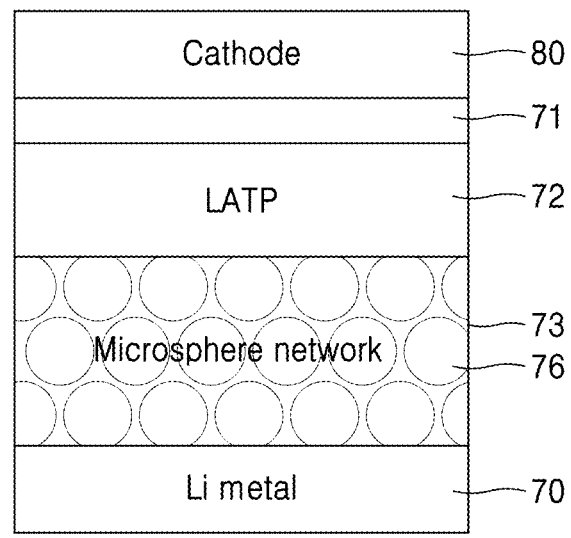
FIG. 7A illustrates a structure of a lithium metal battery in accordance with Example 3.

A lithium metal battery as illustrated in FIG. 7A was manufactured in the same manner as in Example 2, except that the protective layer was not formed on the lithium metal anode. As illustrated in FIG. 7A, the lithium metal battery had a structure in which a lithium metal electrode 70, a first electrolyte 73 including microspheres 76, a second electrolyte 72 including LATP, a catholyte 71, and a cathode 80 were sequentially stacked on the lithium metal anode 70.

Example 4: Manufacture of Lithium Metal Battery

A lithium metal battery was manufactured in the same manner as in Example 1, except that porous microspheres having an average particle diameter of about 3 μm (EPR-PSD-3-300, available from EPRUI Nanoparticles & Microspheres Co., Ltd.) were used, instead of the non-porous poly(styrene-b-divinylbenzene) block copolymer microspheres having an average particle diameter of about 3 μm (EPR-PSD-3, available from EPRUI Nanoparticles & Microspheres Co., Ltd.), to prepare the solid electrolyte. The porous microspheres had a pore diameter of about 30 nm.

Comparative Example 1: Manufacture of Lithium Metal Battery

A lithium metal battery was manufactured in the same manner as in Example 1, except that a polymer electrolyte prepared according to the following process was used, instead of the composite electrolyte structure.

The polymer electrolyte was prepared by mixing polyethylene oxide (PEO), LiFSI, and acetonitrile as a solvent to obtain a polymer electrolyte-forming composition, casting the polymer electrolyte-forming composition, and drying the same at about 40° C. An amount of the LiFSI in the polymer electrolyte forming-composition was about 30 parts by weight based on 100 parts by weight of the PEO, and an amount of the acetonitrile was about 2000 parts by weight based on 100 parts by weight of the PEO.

Comparative Example 2: Manufacture of Lithium Metal Battery

A lithium metal battery was manufactured in the same manner as in Example 3, except that a solid electrolyte-forming composition prepared according to the following process was used.

The solid electrolyte-forming composition was obtained by adding 0.2 g of silica nanoparticles (having an average particle diameter of about 3 μm), 0.3 g of lithium bis (fluorosulfonyl)imide (LiFSI, $LiN(SO_2F)_2$), and 1 g of PEO.

Comparative Example 3: Manufacture of Lithium Metal Battery

A lithium metal battery was manufactured in the same manner as in Comparative Example 2, except that silica was not used to prepare the solid electrolyte-forming composition.

Evaluation Example 1: Lithium Deposition Density and Scanning Electron Microscopy (SEM) Analysis Each of the lithium metal batteries of Examples 1 and 2, and Comparative Example 1, and Comparative Example 2 was charged with a constant current of 0.1 C (0.5 mA/cm$^2$) at about 60° C. until a voltage reached about 4.40 V (with respect to Li), and maintained at a constant voltage of 4.40 V (constant voltage mode) until a cutoff current of 0.05 C rate. After charging one time, a lithium deposition density was measured. The results of the lithium deposition density measurement are shown in Table 1.

TABLE 1

| Example | Lithium deposition density (g/cc) |
|---|---|
| Example 1 | 0.35-0.37 |
| Example 2 | 0.36-0.37 |
| Comparative Example 1 | 0.16-0.19 |

Referring to Table 1, the lithium metal batteries of Examples 1 and 2 were found to have an increased lithium deposition density compared with the lithium metal battery of Comparative Example 1.

Also, surface and cross section status of the lithium metal electrode in the lithium metal battery, on which a lithium deposition layer was formed, was analyzed using SEM. The analysis result was obtained using field-emission scanning electron microscope (FE-SEM, SU8030 FE-SE, available from Hitachi).

Figure 5:
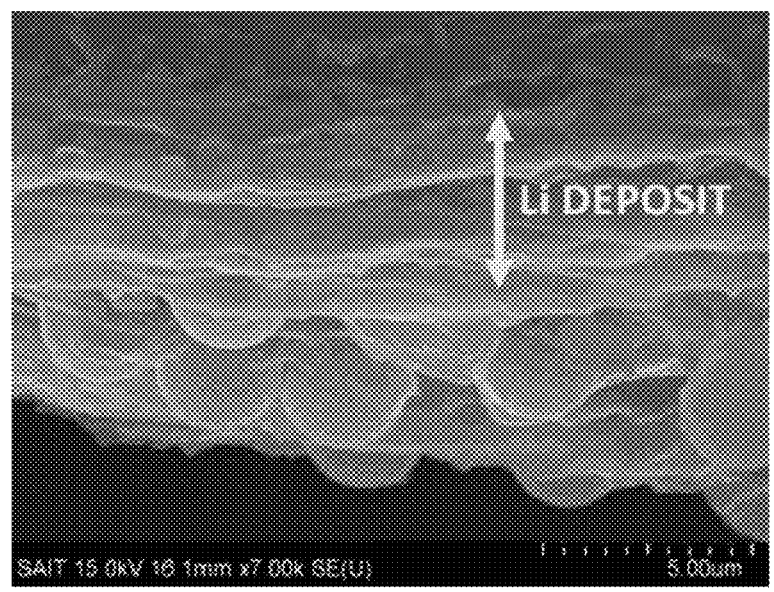
FIG. 5 is a scanning electron microscope (SEM) image of a cross-section of the lithium metal battery of Example 9, showing a lithium deposit layer formed on an anode of the lithium metal battery.
Figure 6A:
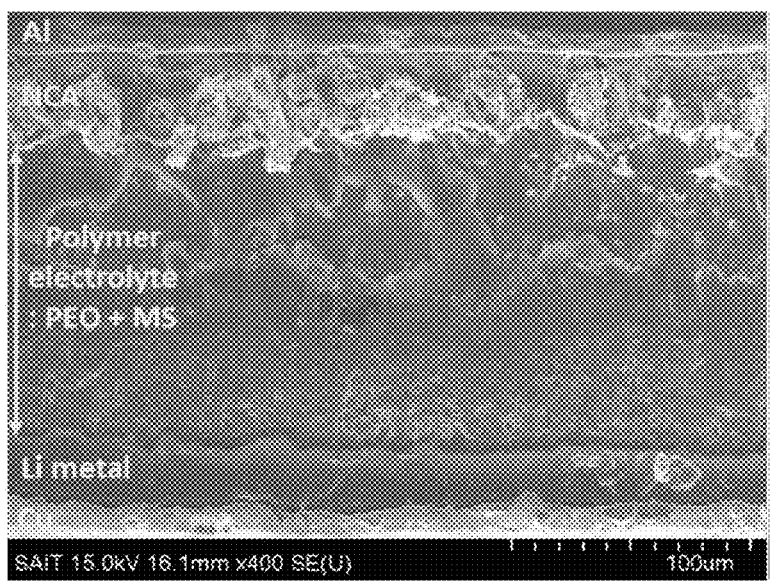
FIGS. 6A to 6D are field-emission scanning electron microscope (FE-SEM) images of the lithium metal battery of Example 1.
Figure 6B:
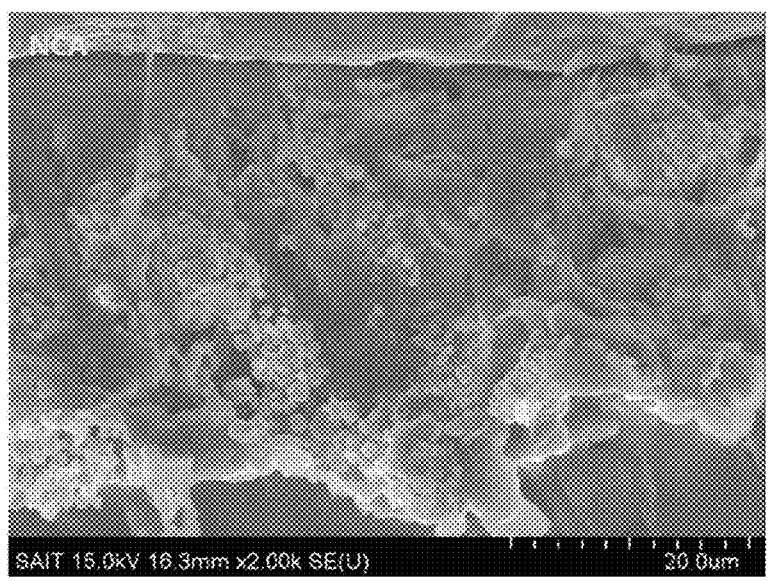
Figure 6C:
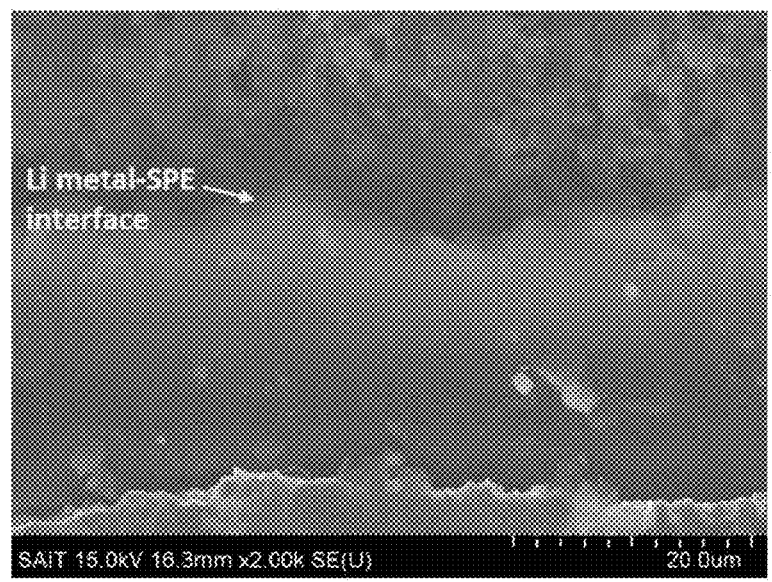
Figure 6D:
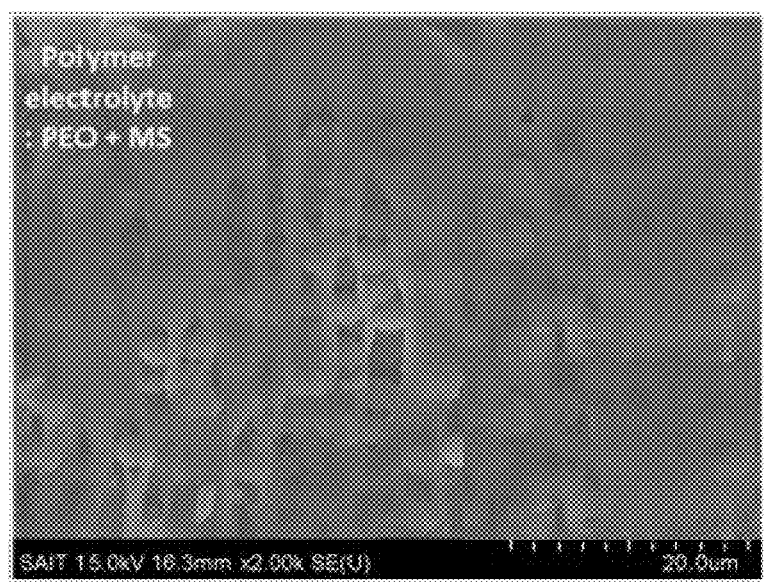

FIG. 5 is a scanning electron microscope (SEM) image of a cross-section of the lithium metal battery of Example 1, illustrating a lithium deposit layer formed on an anode of the lithium metal battery;

Referring to FIG. 5, the lithium metal battery of Example 1 was found to have a lithium deposition layer having a uniform thickness compared to that of the lithium metal battery of Comparative Example 1.

Evaluation Example 3: Cycle Life

The lithium metal batteries of Example 3, Comparative Example 2, and Comparative Example 3 were charged at about 60° C. with a constant current of 0.2 C rate until a voltage reached 4.0 V (with respect to Li), and then with a constant voltage of 4.0 V (constant voltage mode) until a cutoff current of 0.05 C rate, and was then discharged with a constant current of 0.2 C rate until a voltage reached 3.0 V (with respect to Li) (Formation process, 1$^{st}$ cycle).

The lithium metal battery after the formation process was charged at about 60° C. with a current of about 0.2 C rate until a voltage reached about 4.0 V (with respect to Li), and then with a constant voltage of 4.0 V (constant voltage mode) until a cutoff current of 0.05 C rate, and was then discharged with a constant current of 0.2 C rate until a voltage reached 3.0 V (with respect to Li). This charge/discharge cycle was repeated 50 cycles in total.

Change in discharge capacity with respect to the number of cycles in each lithium metal battery was evaluated. The results are shown in FIG. 7B.

Figure 7B:
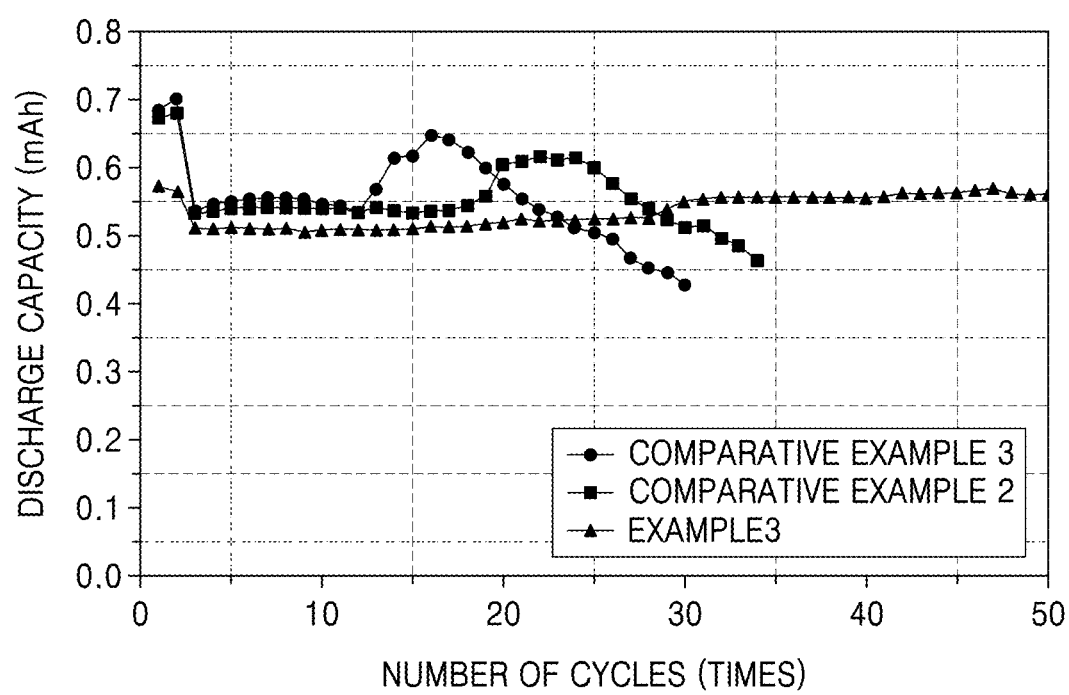
FIG. 7B is a graph of discharge capacity (milliampere hours, mAh) versus the number of cycles for the lithium metal batteries of Example 3 and Comparative Examples 2 and 3.

Referring to FIG. 7B, the lithium metal battery of Example 3 had improved lifetime characteristics, as compared to the lithium metal batteries of Comparative Examples 2 and 3.

Evaluation Example 3: Charge-Discharge Characteristics (Discharge Capacity)

The lithium metal battery of Example 1 was charged at about 25° C. with a constant current of 0.1 C rate until a voltage reached 4.2 V (with respect to Li), and then with a constant voltage of 4.2 V (constant voltage mode) until a cutoff current of 0.05 C rate, and was then discharged with a constant current of 0.1 C rate until a voltage reached 3.0 V (with respect to Li) (Formation process, 1$^{st}$ cycle).

The lithium metal battery after the formation process was charged at about 25° C. with a current of about 0.1 C rate until a voltage reached about 4.2 V (with respect to Li), and then with a constant voltage of 4.2 V (constant voltage mode) until a cutoff current of 0.05 C rate, and was then discharged with a constant current of 0.1 C rate until a voltage reached 3.0 V (with respect to Li). This charge/discharge cycle was repeated 10 cycles in total. After the 10$^{th}$ charge/discharge cycle, each interface of the lithium metal battery was analyzed using a field-emission scanning electron microscope (FE-SEM, SU8030 FE-SE, available from Hitachi). The resulting FE-SEM images are shown in FIGS. 6A to 6D.

Referring to FIGS. 6A to 6D, neither volume change nor dendrite formation occurred in the lithium metal battery of Example 1 after the 10 cycles, indicating that every interface between the components of the lithium metal battery was stable.

Evaluation Example 4: Charge-Discharge Characteristics (Discharge Capacity)

Each of the lithium metal batteries of Examples 3 and 4 and Comparative Example 1 was charged at about 25° C. with a constant current of 0.1 C rate until a voltage reached 4.2 V (with respect to Li), and then with a constant voltage of 4.2 V (constant voltage mode) until a cutoff current of 0.05 C rate, and was then discharged with a constant current of 0.1 C rate until a voltage reached 3.0 V (with respect to Li) (Formation process, 1$^{st}$ cycle).

Each of the lithium metal batteries after the formation process was charged at about 25° C. with a current of about 0.1 C rate until a voltage reached about 4.2 V (with respect to Li), and then with a constant voltage of 4.2 V (constant voltage mode) until a cutoff current of 0.05 C rate, and was then discharged with a constant current of 0.1 C rate until a voltage reached 3.0 V (with respect to Li). This charge/discharge cycle was repeated. Cell voltage change with respect to capacity in each of the lithium metal batteries is shown in FIG. 8.

Figure 8:
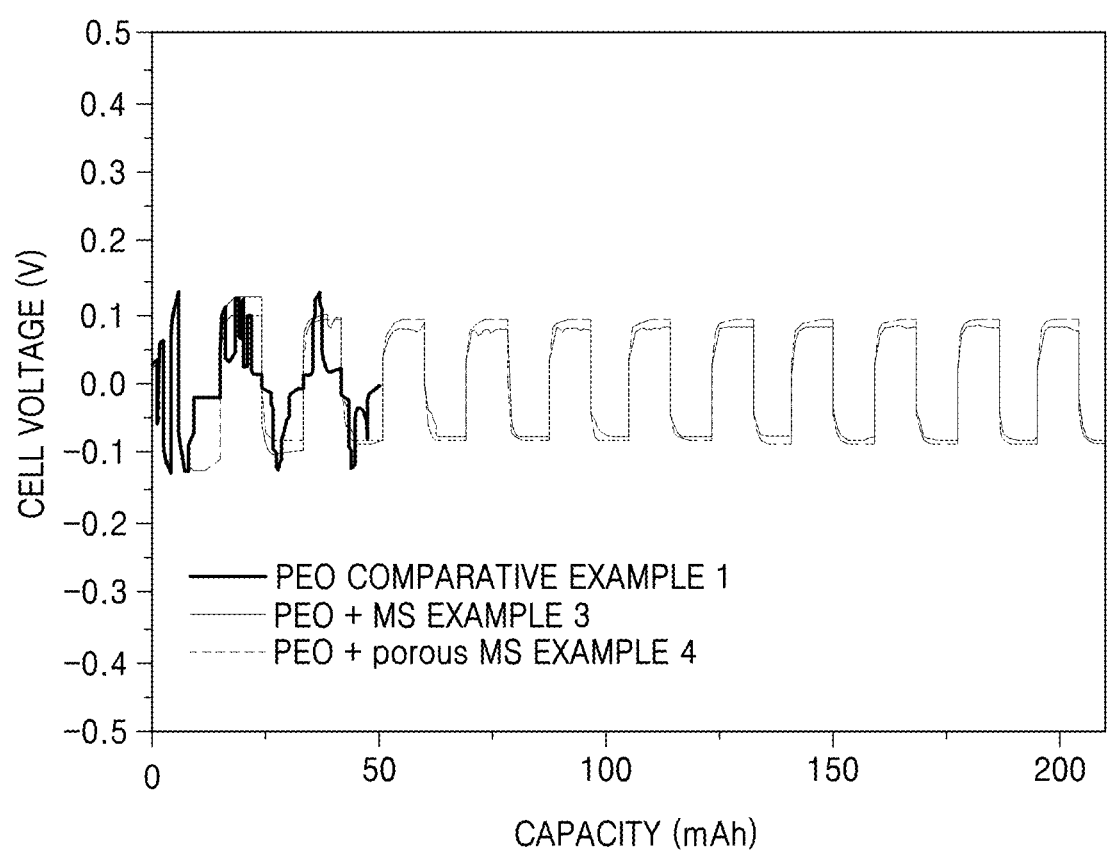
FIG. 8 is a graph of cell voltage (volts, V) versus capacity (mAh) for the lithium metal batteries of Examples 3 and 4 and Comparative Example 1.

Referring to FIG. 8, the lithium metal battery of Example 3 using the solid electrolyte including non-porous microspheres, and the lithium metal battery of Example 4 using the solid electrolyte including porous microspheres of Example 4 were found to have improved voltage characteristics, as compared to the lithium metal battery of Comparative Example 1.

Evaluation Example 5: Charge-Discharge Characteristics (Cell Voltage)

A solid electrolyte-forming composition was cast onto opposite surfaces of a LATP electrolyte and dried at about 40° C. to form a solid electrolyte on the LATP electrolyte, thereby manufacturing a composite electrolyte structure.

The solid electrolyte-forming composition was obtained according to the following process. A PS-PEO-PS block copolymer was mixed with acetonitrile to obtain a 5 wt % PS-PEO-PS block copolymer-acetonitrile solution. To the PS-PEO-PS block copolymer-acetonitrile solution, a block copolymer-containing mixture and lithium bis(fluorosulfonyl)imide (LiFSI, LiN(SO$_2$F)$_2$) were added, thereby obtaining the solid electrolyte-forming composition.

The block copolymer-containing mixture was obtained by adding poly(styrene-b-divinylbenzene) block copolymer microspheres (having an average particle diameter of about 3 μm (EPR-PSD-3, available from EPRUI Nanoparticles & Microspheres Co., Ltd.) to anhydrous tetrahydrofuran and mixing them together. An amount of the poly(styrene-b-divinylbenzene) block copolymer microspheres was about 5 wt %.

A ratio of a polystyrene block to a polydivinylbenzene block in the poly(styrene-b-divinylbenzene) block copolymer was about 9:1 by weight. The poly(styrene-b-divinylbenzene) block copolymer had a weight average molecular weight of about 100,000 Daltons.

An amount of the poly(styrene-b-divinylbenzene) block copolymer microspheres in the solid electrolyte-forming composition was about 20 parts by weight based on 100 parts by weight of the PS-PEO-PS block copolymer, and an amount of the LiFSI was about 30 parts by weight based on 100 parts by weight of the PS-PEO-PS block copolymer.

A ratio of a polystyrene block to a polyethyleneoxide block to a polystyrene block in the PS-PEO-PS block copolymer was about 10:37:10 by weight, and the PS-PEO-PS block copolymer had a weight average molecular weight of about 57,000 Daltons.

A lithium metal was stacked on opposite surfaces of the composite electrolyte structure obtained through the above-described processes, thereby manufacturing a symmetric cell.

Cell voltage changes with respect to capacity in the symmetric cells at various current densities and about 60° C. were measured. The results are shown in FIGS. 9A and 9B.

Figure 9A:
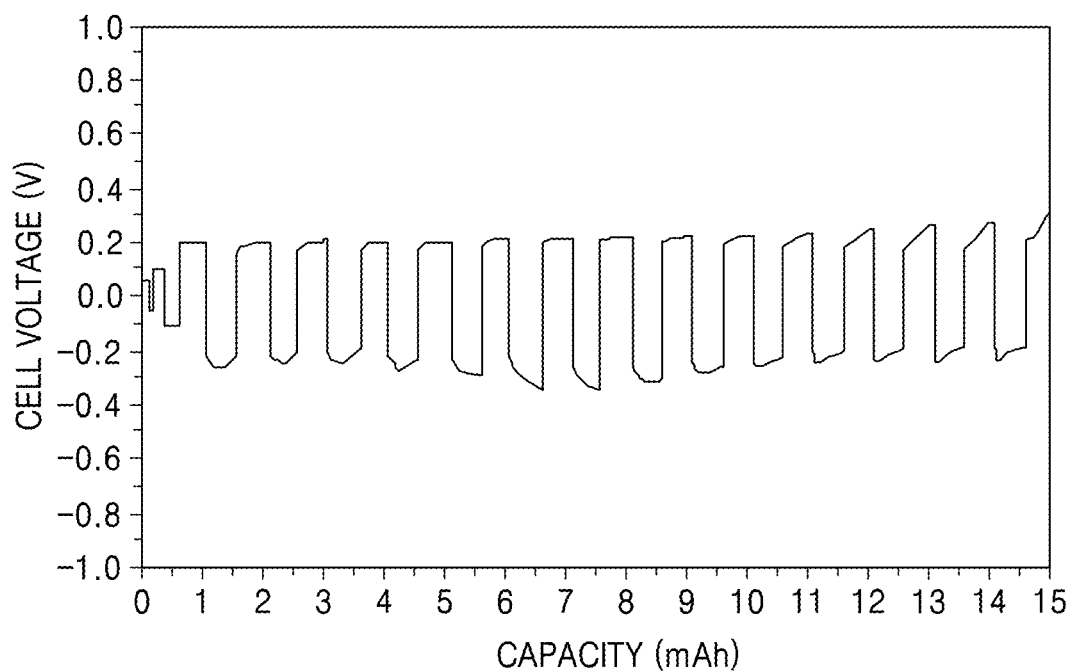
FIGS. 9A and 9B are graphs of cell voltage (V) versus capacity (mAh) at various current densities and at 60° C. in symmetric cells having a composite electrolyte structure including a $Li_{1+x}Al_xTi_{2-x}(PO_4)_3$ (LATP) electrolyte.
Figure 9B:
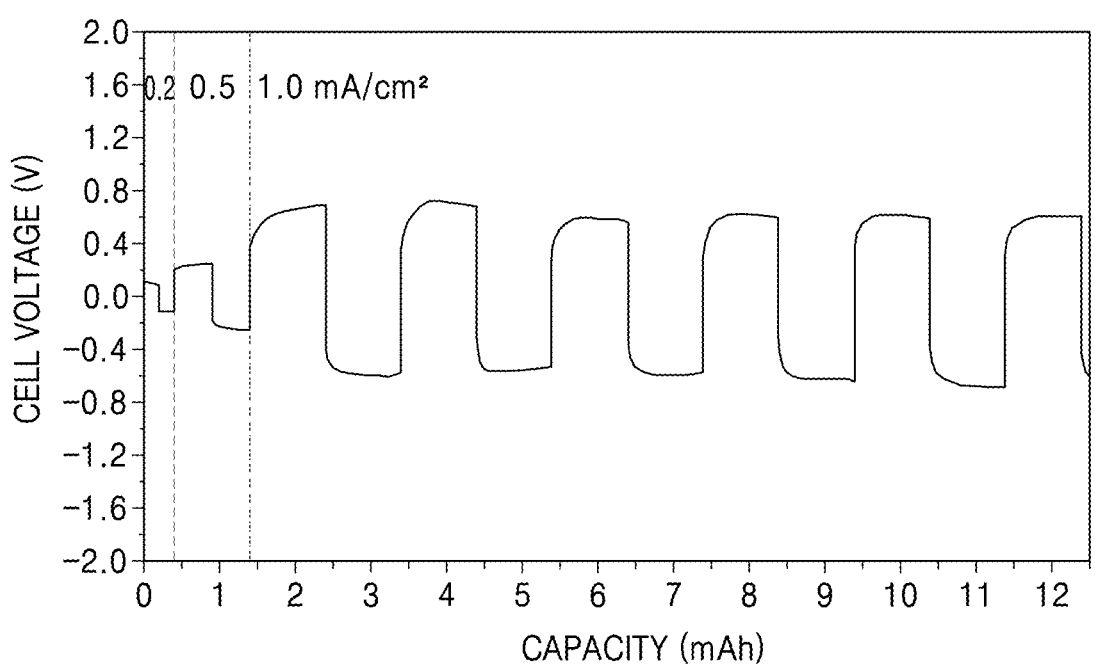

Referring to FIGS. 9A and 9B, it was found that the symmetric cell is operable at a high current density and that the solid electrolyte may serve well as a protective layer of the ceramic conductor-containing electrolyte.

Evaluation Example 6: Charge-Discharge Characteristics (Rate Capability Characteristics)

After the formation of the protective layer in Example 1, a solid electrolyte-forming composition was cast onto the protective layer and dried at about 40° C. to deposit a solid electrolyte on the protective layer, thereby manufacturing a composite electrolyte structure.

The solid electrolyte-forming composition was obtained as follows. A PS-PEO-PS block copolymer and acetonitrile were mixed to obtain a 5 wt % PS-PEO-PS block copolymer-acetonitrile solution. To the PS-PEO-PS block copolymer-acetonitrile solution, a block copolymer-containing mixture and lithium bis(fluorosulfonyl)imide (LiFSI, LiN(SO$_2$F)$_2$) were added to obtain the solid electrolyte-forming composition.

The block copolymer-containing mixture was obtained by adding poly(styrene-b-divinylbenzene) block copolymer microspheres (having an average particle diameter of about 3 μm (EPR-PSD-3, available from EPRUI Nanoparticles & Microspheres Co., Ltd.) to anhydrous tetrahydrofuran and mixing them together. An amount of the block copolymer was about 5 wt %.

A ratio of a polystyrene block to a polydivinylbenzene block in the block copolymer was about 9:1 by weight. The poly(styrene-b-divinylbenzene) block copolymer had a weight average molecular weight of about 100,000 Daltons.

An amount of poly(styrene-b-divinylbenzene) block copolymer microspheres in the solid electrolyte-forming composition was about 20 parts by weight based on 100 parts by weight of the PS-PEO-PS block copolymer. An amount of the LiFSI was about 30 parts by weight based on 100 parts by weight of the PS-PEO-PS block copolymer.

A lithium metal was deposited on opposite surfaces of the composite electrolyte structure obtained through the above-described processes, thereby manufacturing a symmetric cell. The performance of this symmetric cell was compared with that of a reference symmetric cell using an electrolyte structure, which was manufactured as follows.

A PEO-PS-PEO block copolymer (including a PEO block, a PS block, and a PEO block in a ratio of about 10:37:10 by mole), Pyr13FSI as an ionic liquid, and tetraethylene glycol dimethyl ether (G4) were mixed together and used to form an electrolyte structure. A lithium metal was deposited on opposite surfaces of the electrolyte structure, thereby manufacturing the reference symmetric cell. An amount of the Pyr13FSI was 50 parts by weight based on 100 parts by weight of the PEO-PS-PEO block copolymer, and an amount of the G4 was about 20 parts by weight based on 100 parts by weight of the PEO-PS-PEO block copolymer.

Cell voltage changes with respect to capacity in the symmetric cell and the reference symmetric cell at various densities and about 60° C. were measured. The results are shown in FIGS. 10A and 10B.

Figure 10A:
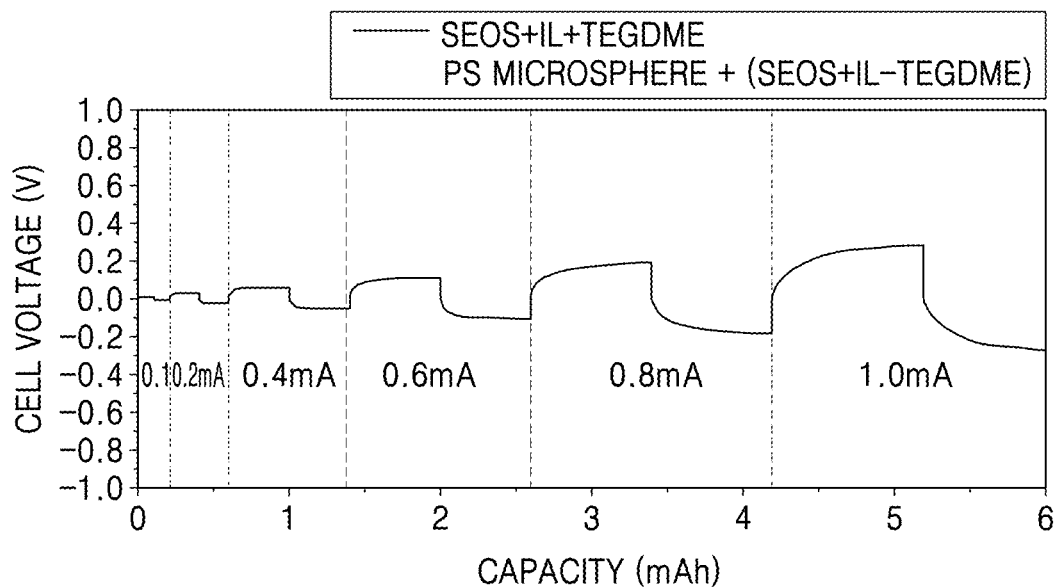
FIG. 10A is a graph of cell voltage (V) versus capacity (mAh) at various current densities and at 60° C. for a symmetric cell including a composite electrolyte structure manufactured by depositing a solid electrolyte on the protective layer of Example 1.
Figure 10B:
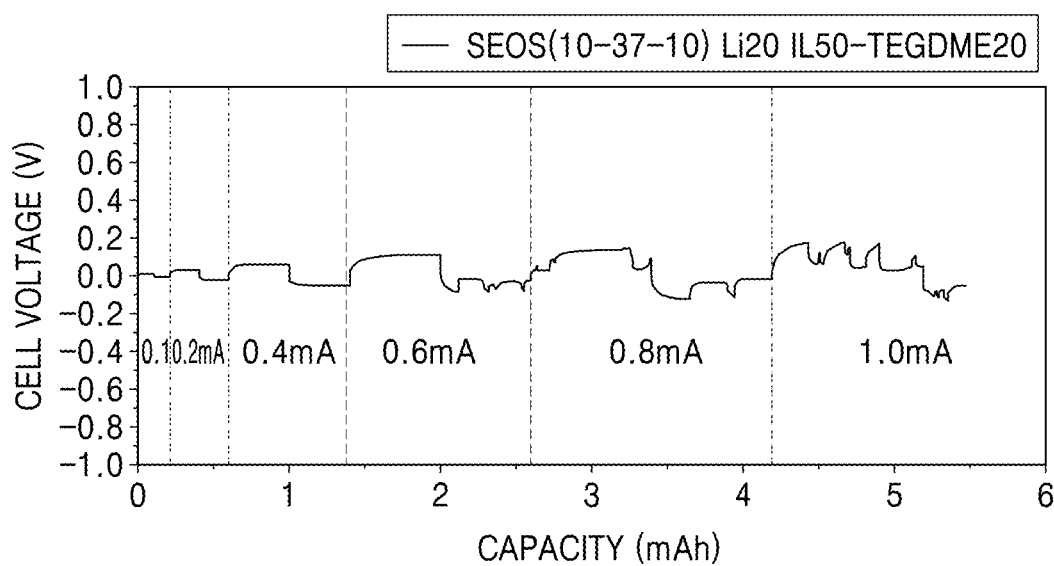
FIG. 10B is a graph of cell voltage (V) versus capacity (mAh) at various current densities and at 60° C. for a reference symmetric cell using a simple electrolyte structure.

Referring to FIGS. 10A and 10B, the symmetric cell using the composite electrolyte structure (FIG. 10A) was found to have improved limiting current density, as compared to that of the reference symmetric cell using the electrolyte structure (FIG. 10B).

Evaluation Example 7: Tensile Modulus

Mechanical properties of a polyethylene oxide (PEO) layer, a layer formed of a mixture of PEO, LiTFSI, and silica microspheres (MS) having an average particle diameter of about 3 μm, and a layer formed of a mixture of PEO, LiTFSI, and silica nanoparticles (NPs) having an average particle diameter of about 7 nm were measured. The layers each had a thickness of about 50 μm.

A tensile modulus of each of the protective layers was measured using a DMA800 (available from TA Instruments). Protective layer samples for the tensile modulus measurement were prepared according to the ASTM standard D412 (Type V specimens). The tensile modulus is also known as Young's modulus.

Changes in strain with respect to stress in each of the protective layers were measured at about 25° C. or 60° C., a relative humidity of about 30%, and a rate of 5 millimeters per minute (mm/min). The tensile modulus of each of the protective layers was calculated from the slope of a stress-strain curve thereof.

Figure 11A:
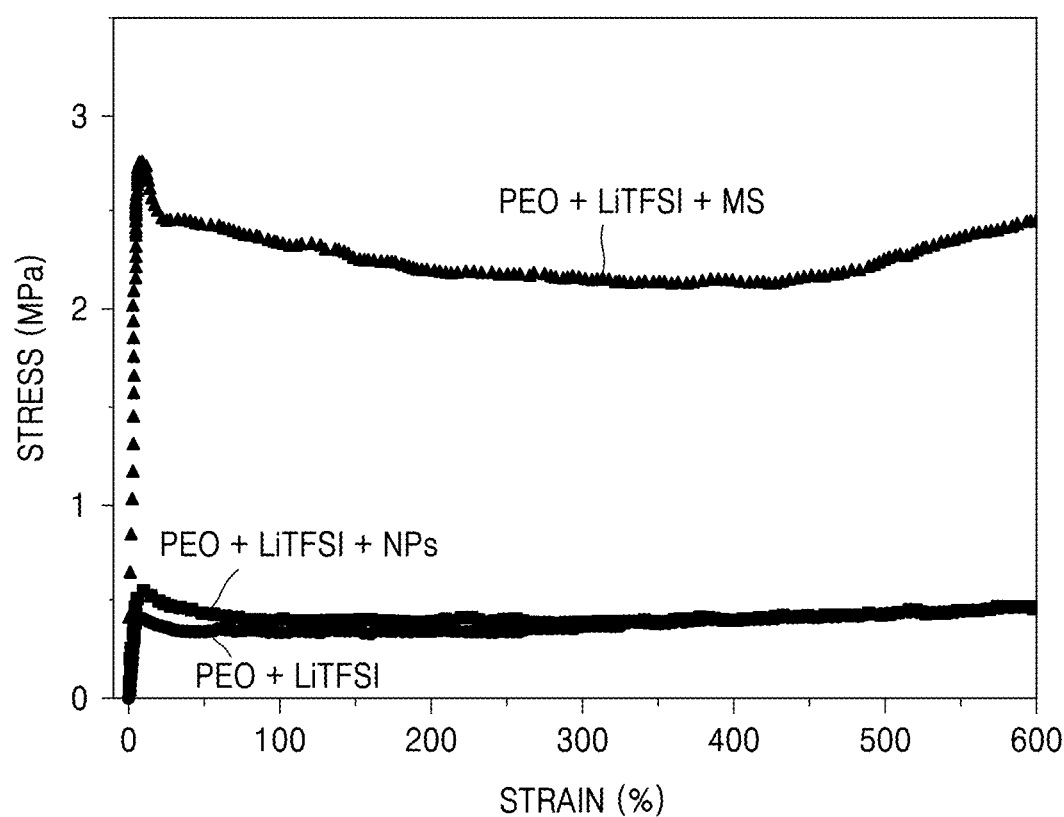
FIGS. 11A and 11B are each a graph of stress (megapascals, MPa) versus strain (%), illustrating the results of tensile modulus evaluation of a polyethylene oxide (PEO) layer, a layer formed of a mixture of PEO, LiTFSI, and microspheres (MS) having an average particle diameter of about 3 μm, and a layer formed of a mixture of PEO, LiTFSI, and silica nanoparticles (NPs) having an average particle diameter of about 7 nm.
Figure 11B:
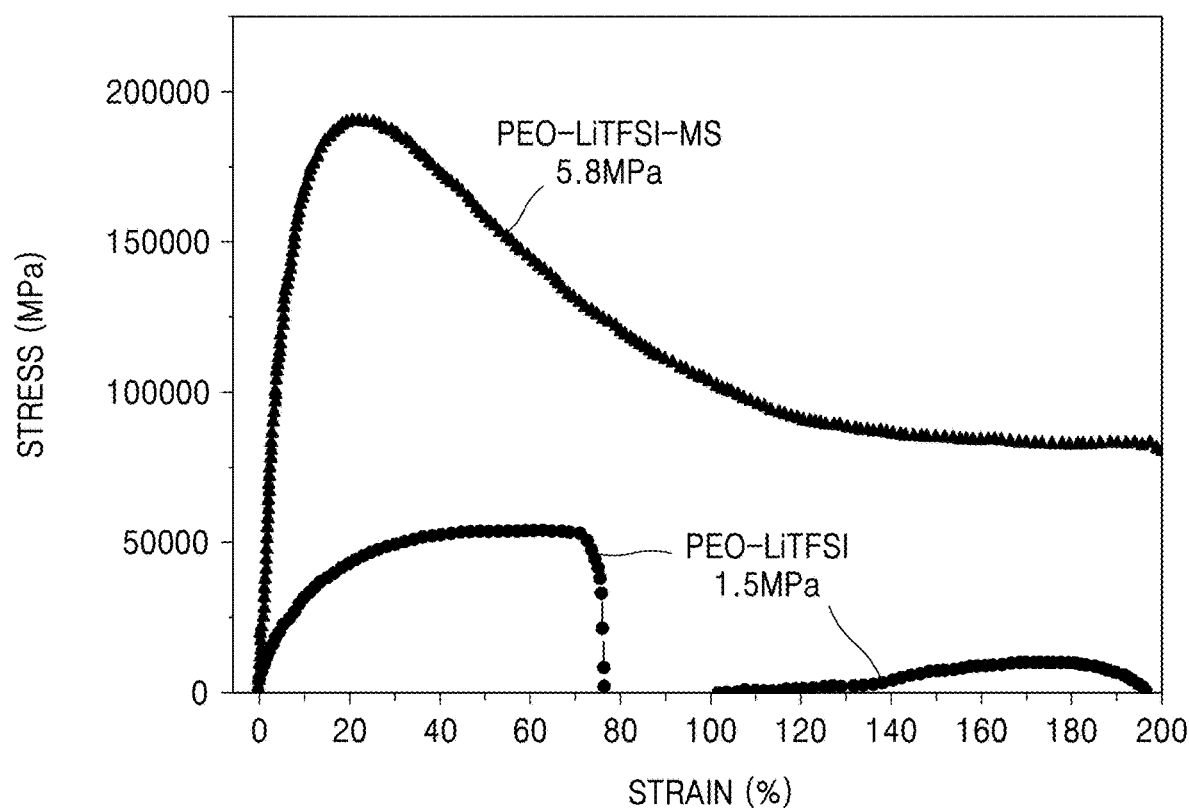

The results of the tensile modulus evaluation are shown in FIGS. 11A and 11B, and Table 2.

TABLE 2

| Characteristic | PEO | PEO + NPs | PEO + MS |
|---|---|---|---|
| Tensile modulus (MPa) (25° C.) | 20.9 | 36 | 130 |

Referring to FIGS. 11A and 11B and Table 2, the layer including the microspheres was found to have an increased tensile modulus by 3 fold or more.

Thus, using the protective layer of Example 1 having such improved characteristics may effectively suppress volumetric change of the lithium metal anode and growth of lithium dendrite.

Evaluation Example 8: Electrochemical Stability

A solid electrolyte-forming composition was cast onto a supporting substrate and dried at about 40° C. to form a solid electrolyte A.

The solid electrolyte-forming composition was obtained as follows.

Polyethylene oxide (PEO) and acetonitrile were mixed together to obtain a 5 wt % PEO-acetonitrile solution. To the PEO-acetonitrile solution a block copolymer-containing mixture and lithium bis(fluorosulfonyl)imide (LiFSI, LiN(SO$_2$F)$_2$) were added to obtain a solid electrolyte A-forming composition.

The block copolymer-containing mixture was obtained by adding poly(styrene-b-divinylbenzene) block copolymer microspheres (having an average particle diameter of about 3 μm (EPR-PSD-3, available from EPRUI Nanoparticles & Microspheres Co., Ltd.) to anhydrous tetrahydrofuran and mixing them together. An amount of the block copolymer was about 5 wt %.

A ratio of a polystyrene block to a polydivinylbenzene block in the block copolymer was about 9:1 by weight. The poly(styrene-b-divinylbenzene) block copolymer had a weight average molecular weight of about 100,000 Daltons.

An amount of the poly(styrene-b-divinylbenzene) block copolymer in the solid electrolyte-forming composition was about 15 parts by weight based on 100 parts by weight of the PEO, and an amount of the LiFSI was about 30 parts by weight based on 100 parts by weight of the PEO.

A lithium metal and a SUS plate were stacked on opposite surfaces of the solid electrolyte A, respectively, thereby manufacturing a battery A having a stack structure of the lithium metal/composite electrolyte structure/SUS battery.

A solid electrolyte B was prepared in the same manner as in the preparation of the solid electrolyte A as described above, except that poly(styrene-b-divinylbenzene) block copolymer microspheres were not added in the solid electrolyte-forming composition. A battery B having a stack structure of the lithium metal/composite electrolyte structure/SUS battery was manufactured using the solid electrolyte B.

Electrochemical stability of the composite electrolyte structure coated on the lithium metal in each of the batteries A and B was evaluated by cyclic voltammetry at about 60° C. at a scan rate of about 1 millivolt per second (mV/sec) in a voltage range of about 0.1 to about 5.5 V (with respect to Li). The electrochemical stability evaluation results are shown in FIGS. 12A and 12B.

Figure 12A:
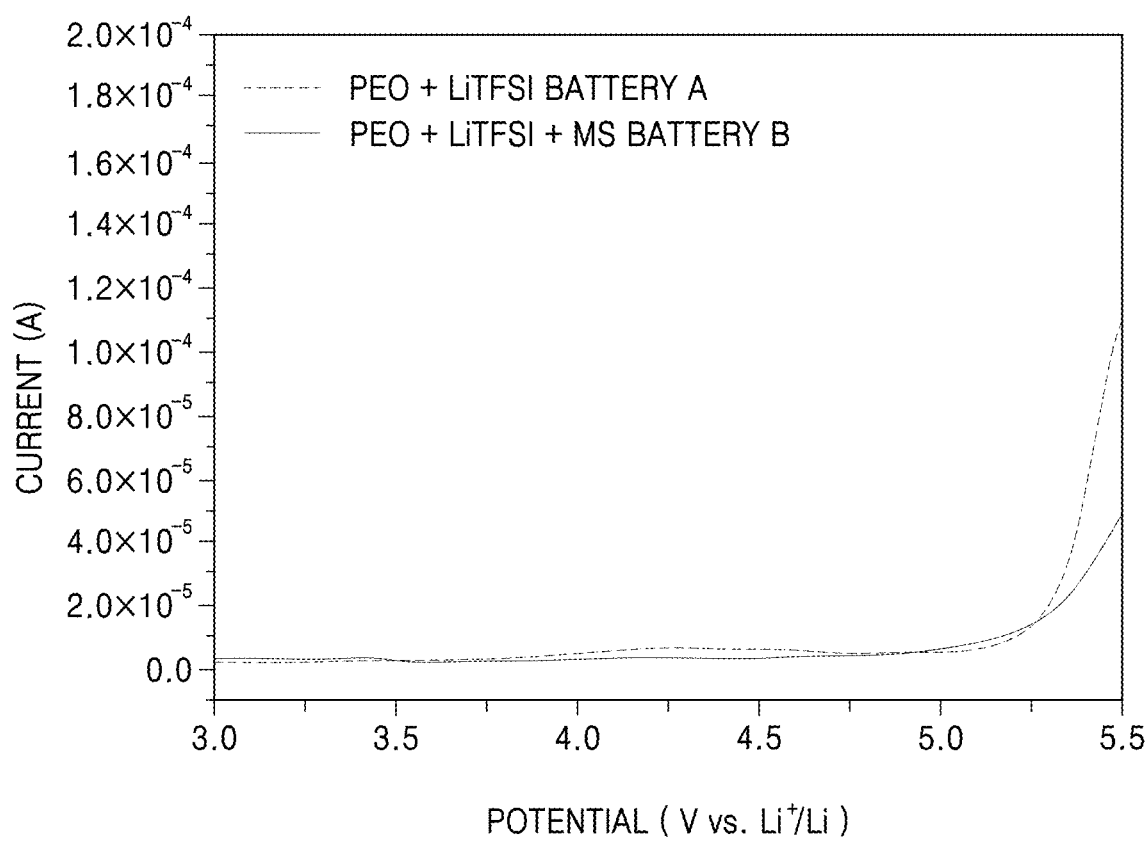
FIGS. 12A and 12B are each a graph of current (ampere, A) versus potential (V vs $Li^+/Li$), illustrating the results of electrochemical stability evaluation of example batteries A and B.
Figure 12B:
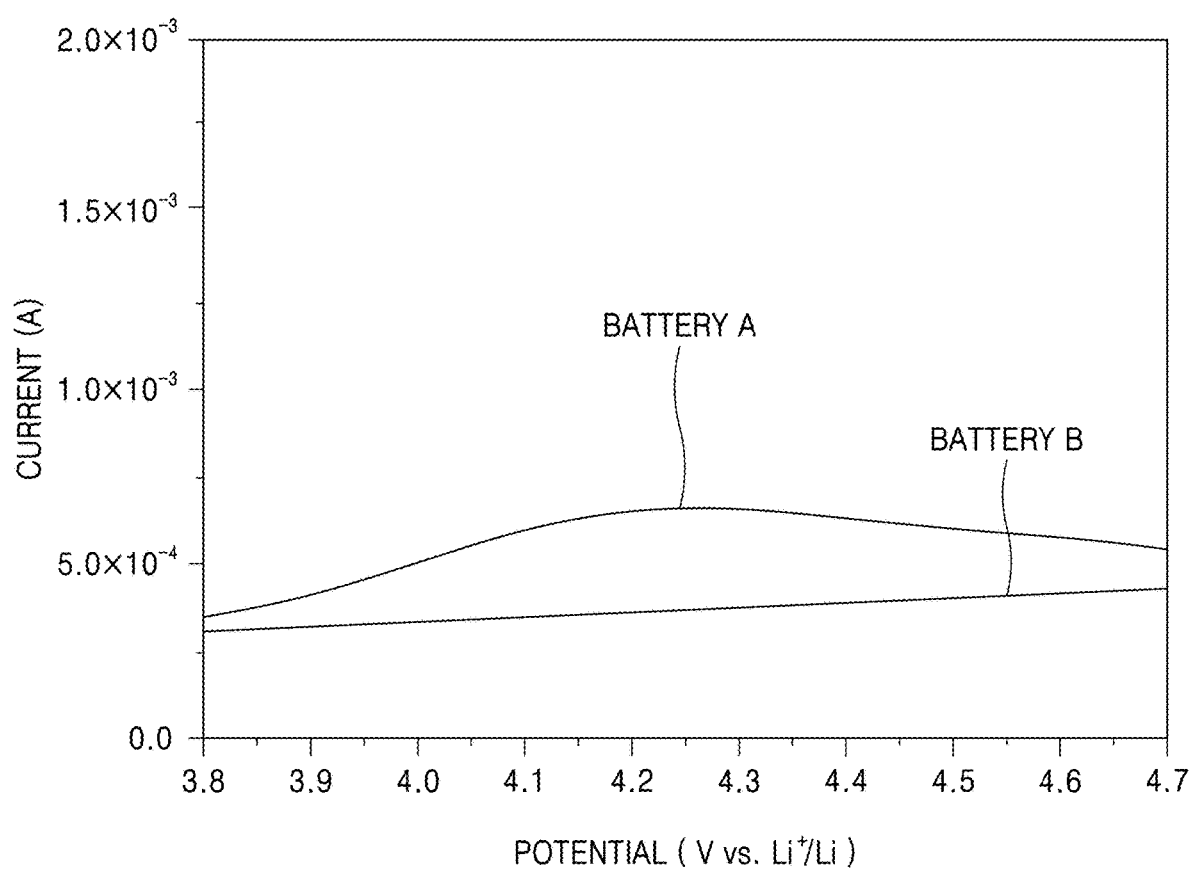

Referring to FIGS. 12A and 12B, the battery A was found to be electrochemically stable in a voltage range of about 3.0 V to about 5.5 V, unlike the battery B.

As described above, according to the one or more embodiments, a composite electrolyte structure according to any of the above-described embodiments has improved strength, uniformly controlled charge distribution, and is capable of effectively suppressing growth of lithium dendrites. By using the composite electrolyte structure, a catholyte and an anolyte may be separated from one another, and thus a lithium metal battery may have improved high-voltage stability.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite electrolyte structure comprising:
a protective layer having a Young's modulus of about $10^6$ pascals to about $10^{11}$ pascals and comprising a crosslinked polymer and a first particle, the first particle comprising an organic particle,
wherein the first particle has a particle size of greater than 1 micrometer to about 100 micrometers,
wherein the crosslinked polymer is a crosslinked material of a polymerizable compound and the crosslinked polymer is between first particles of the protective layer, and
wherein an amount of the crosslinked polymerizable compound is in a range of about 10 parts by weight to about 50 parts by weight, based on 100 parts by weight of the first particle in the protective layer; and
a solid electrolyte layer comprising a polymer, a lithium salt, and a second particle, the second particle comprising an organic particle, wherein the second particle has an average particle size of greater than 1 micrometer to about 100 micrometers,
wherein the protective layer is on the solid electrolyte layer,
wherein the first particle and the second particle are the same or different, and
wherein the first particle of the protective layer and the second particle of the solid electrolyte layer each independently comprise a homopolystyrene, a copolymer comprising a styrene repeating unit, or a combination thereof.

2. The composite electrolyte structure of claim 1, wherein the first particle and the second particle are each a porous hollow particle.

3. The composite electrolyte structure of claim 1, wherein the first particle or the second particle comprises a porous particle having an average pore diameter of about 10 nanometers to about 50 nanometers.

4. The composite electrolyte structure of claim 1, wherein the first particle or the second particle comprises a microsphere having an average diameter of about 1.1 micrometer to about 50 micrometers.

5. The composite electrolyte structure of claim 1, wherein the polymerizable compound in the protective layer comprises diethylene glycol diacrylate, triethylene glycol diacrylate, tetraethylene glycol diacrylate, polyethylene glycol diacrylate, dipropylene glycol diacrylate, tripropylene glycol diacrylate), ethoxylated trimethylolpropane triacrylate, acrylate-functionalized ethylene oxide, 1,6-hexanediol diacrylate, ethoxylated neopentyl glycol diacrylate, propoxylated neopentyl glycol diacrylate, allyl methacrylate, trimethylolpropane triacrylate, trimethylolpropane trimethacrylate, pentaerythritol triacrylate, ethoxylated propoxylated trimethylolpropane triacrylate, glyceryl/propoxylated triacrylate, tris(2-hydroxyethyl) isocyanurate triacrylate, pentaerythritol tetraacrylate, dipentaerythritol pentaacrylate, dipentaerythritol pentaacrylate, or a combination thereof.

6. A lithium metal battery comprising:
an anode comprising a lithium metal electrode comprising lithium metal or a lithium metal alloy;
the composite electrolyte structure of claim 1 between the anode and the cathode, wherein the protective layer of the composite electrolyte is on at least a portion of the lithium metal electrode; and
a cathode.

7. A method of manufacturing a composite electrolyte structure, the method comprising:
providing a first composition for forming a protective layer, the first composition comprising a polymerizable compound and a first particle comprising an organic particle;
disposing the first composition on a substrate and crosslinking and polymerizing the polymerizable compound to form a protective layer having a Young's modulus of about $10^6$ pascals to about $10^{11}$ pascals and comprising a crosslinked polymer and the first particle,
wherein the first particle has a particle size of greater than 1 micrometer to about 100 micrometers,
wherein the crosslinked polymer is a crosslinked material of the polymerizable compound and is between first particles of the protective layer, and
wherein an amount of the crosslinked polymerizable compound is in a range of about 10 parts by weight to about 50 parts by weight, based on 100 parts by weight of the first particle in the protective layer;
providing a second composition for forming a solid electrolyte, the second composition comprising a polymer, a first lithium salt, and a second particle comprising an organic particle, wherein the second particle has an average particle size of greater than 1 micrometer to about 100 micrometers; and
disposing the second composition on the protective layer to form a solid electrolyte layer on the protective layer,
wherein the first particle and the second particle are the same or different, and
wherein the first particle in the protective layer and the second particle of the solid electrolyte layer each independently comprises a homopolystyrene, a copolymer comprising a styrene repeating unit, or a combination thereof.

* * * * *